(12) United States Patent
Kubota et al.

(10) Patent No.: US 11,739,284 B2
(45) Date of Patent: Aug. 29, 2023

(54) COMPOSITE MATERIAL

(71) Applicants: NISSHINBO HOLDINGS INC., Tokyo (JP); NATIONAL INSTITUTE OF TECHNOLOGY, Hachioji (JP)

(72) Inventors: Satoshi Kubota, Chiba (JP); Gen Masuda, Chiba (JP); Takaya Sato, Tsuruoka (JP); Hiroyuki Arafune, Tsuruoka (JP)

(73) Assignees: NISSHINBO HOLDINGS INC., Tokyo (JP); NATIONAL INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/764,269

(22) PCT Filed: Sep. 23, 2020

(86) PCT No.: PCT/JP2020/035801
§ 371 (c)(1),
(2) Date: Mar. 28, 2022

(87) PCT Pub. No.: WO2021/065621
PCT Pub. Date: Apr. 8, 2021

(65) Prior Publication Data
US 2022/0389347 A1    Dec. 8, 2022

(30) Foreign Application Priority Data
Sep. 30, 2019 (JP) .................. 2019-178545

(51) Int. Cl.
*C10M 169/04* (2006.01)
*C10M 107/50* (2006.01)
(Continued)

(52) U.S. Cl.
CPC ........ *C10M 169/04* (2013.01); *C10M 107/50* (2013.01); *C10M 125/18* (2013.01);
(Continued)

(58) Field of Classification Search
CPC .............. C10M 169/04; C10M 107/50; C10M 125/18; C10M 129/08; C10M 133/06;
(Continued)

(56) References Cited

U.S. PATENT DOCUMENTS

| | | |
|---|---|---|
| 2008/0057310 A1 | 3/2008 | Ohno et al. |
| 2014/0271351 A1 | 9/2014 | Nielsen et al. |

(Continued)

FOREIGN PATENT DOCUMENTS

| | | |
|---|---|---|
| EP | 3409691 A1 | 12/2018 |
| JP | 2009-059659 A | 3/2009 |

(Continued)

OTHER PUBLICATIONS

Nov. 10, 2020 International Search Report issued in International Patent Application No. PCT/JP2020/035801.

*Primary Examiner* — Cephia D Toomer
(74) *Attorney, Agent, or Firm* — Oliff PLC

(57) ABSTRACT

A composite material comprising a plurality of polymer chains fixed to a base and swelled with a mixture which contains a salt and a hydrogen bond-donating compound and has a melting point maintained at 100° C. or less.

15 Claims, 4 Drawing Sheets

(51) Int. Cl.
*C10M 125/18* (2006.01)
*C10M 129/08* (2006.01)
*C10M 133/06* (2006.01)
*C10M 133/08* (2006.01)
*C10M 133/20* (2006.01)
*C10M 133/46* (2006.01)
*C10M 137/12* (2006.01)
*C10M 141/10* (2006.01)
*C10N 50/00* (2006.01)

(52) U.S. Cl.
CPC ........ *C10M 129/08* (2013.01); *C10M 133/06* (2013.01); *C10M 133/08* (2013.01); *C10M 133/20* (2013.01); *C10M 133/46* (2013.01); *C10M 137/12* (2013.01); *C10M 141/10* (2013.01); *C10M 2201/081* (2013.01); *C10M 2207/022* (2013.01); *C10M 2215/26* (2013.01); *C10M 2215/28* (2013.01); *C10M 2215/30* (2013.01); *C10M 2223/06* (2013.01); *C10M 2229/0515* (2013.01); *C10M 2229/0535* (2013.01); *C10N 2050/023* (2020.05)

(58) Field of Classification Search
CPC .............. C10M 133/08; C10M 133/20; C10M 133/46; C10M 137/12; C10M 141/10; C10M 2201/081; C10M 2207/022; C10M 2215/26; C10M 2215/28; C10M 2215/30; C10M 2223/06; C10M 2229/0515; C10M 2229/0535; C10M 2207/283; C10M 2215/102; C10M 2215/224; C10N 2050/023; C10N 2020/04; C10N 2020/077; C10N 2030/06; C10N 2050/02; C10N 2050/025; C10N 2050/14; C08J 7/02

See application file for complete search history.

(56) References Cited

U.S. PATENT DOCUMENTS

| | | | |
|---|---|---|---|
| 2019/0100631 | A1 | 4/2019 | Tsujii et al. |
| 2019/0119596 | A1 | 4/2019 | Tsujii et al. |
| 2019/0389889 | A1 | 12/2019 | Masuda |
| 2020/0181309 | A1 | 6/2020 | Tadokoro et al. |

FOREIGN PATENT DOCUMENTS

| | | | | |
|---|---|---|---|---|
| JP | 2010-218984 | A | 9/2010 | |
| JP | 2011-057766 | A | 3/2011 | |
| JP | 2012-056165 | A | 3/2012 | |
| JP | 2019-065284 | A | 4/2019 | |
| JP | 2019-065787 | A | 4/2019 | |
| WO | 2006/087839 | A1 | 8/2006 | |
| WO | WO-2014009059 | A1 * | 1/2014 | .......... C10M 107/28 |
| WO | 2017/171071 | A1 | 10/2017 | |
| WO | 2018/105482 | A1 | 6/2018 | |
| WO | 2018/199181 | A1 | 11/2018 | |
| WO | 2018/225693 | A1 | 12/2018 | |

* cited by examiner

COMPOSITE MATERIAL

TECHNICAL FIELD

The present invention relates to a composite material having low friction sliding properties.

BACKGROUND ART

It has been common knowledge that sliding surfaces having a polymer brush layer have a low friction coefficient. For example, Patent Document 1 discloses a sliding member having a sliding surface which includes a Si-containing diamond-like carbon layer disposed on a base and a polymer brush layer covalently fixed to the Si-containing diamond-like carbon layer. The technique disclosed in Patent Document 1 aims at providing a low coefficient of friction under oil lubrication.

It has been also known that polymer brush layers composed of a plurality of polymer graft chains have a low coefficient of friction. For example, Patent Document 2 discloses a polymer brush layer including polymer graft chains which are formed on a base by copolymerizing methyl methacrylate and a monomer copolymerizable therewith and which are swelled with N,N-diethyl-N-methyl-N-(2-methoxyethyl) ammonium•bis(trifluoromethylsulfonyl) imide (DEME-TFSI) or 1-butyl-3-methylimidazolium hexafluorophosphate (BMI-PF$_6$).

RELATED ART DOCUMENTS

Patent Documents

Patent Document 1: JP-A 2012-56165
Patent Document 2: International Publication No. WO 2017/171071

SUMMARY OF THE INVENTION

Problem to be Solved by the Invention

In the techniques disclosed in Patent Documents 1 and 2, the coefficient of friction can be reduced to some extent by friction sliding under oil lubrication in the former and by the swelled polymer brush layer in the latter. However, to ensure higher performance, there has been a demand for a material having further improved low friction sliding properties.

The present invention has been made in such circumstances, and an object of the present invention is to provide a composite material having low friction sliding properties.

Means for Solving Problems

The present inventors, who have conducted extensive research to achieve the above object, have found that the object can be solved by a composite material comprising a plurality of polymer chains fixed to a substrate and swelled with a mixture which contains a salt and a hydrogen bond-donating compound and has a melting point maintained at 100° C. or less, and thus have completed the present invention.

Namely, the present invention provides the followings.

[1] A composite material comprising a plurality of polymer chains fixed to a substrate and swelled with a mixture which contains a salt and a hydrogen bond-donating compound and has a melting point maintained at 100° C. or less.

[2] The composite material according to [1], wherein the mixture has a melting point lower than that of the salt as a constituent of the mixture and that of the hydrogen bond-donating compound as a constituent of the mixture.

[3] The composite material according to [1] or [2], wherein the melting point of the mixture is maintained at 100° C. or less by mixing the salt and the hydrogen bond-donating compound to provide lowering of a eutectic melting point.

[4] The composite material according to any one of [1] to [3], wherein the mixture further contains a third component having compatibility with the salt and the hydrogen bond-donating compound.

[5] The composite material according to any one of [1] to [4], wherein the salt contained in the mixture is solid at normal temperature (25° C.) and the hydrogen bond-donating compound contained therein is solid at normal temperature (25° C.).

[6] The composite material according to any one of [1] to [5], wherein the salt and the hydrogen bond-donating compound constitute the mixture in a molar ratio of "salt:hydrogen bond-donating compound" of 1:0.5 to 1:12.

[7] The composite material according to any one of [1] to [6], wherein the salt in the mixture is a compound represented by General Formula (1) or (2)

[Chem. 1]

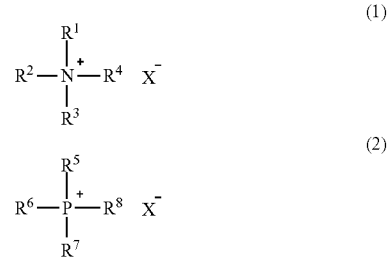

(where in General Formulae (1) and (2), $R^1$ to $R^8$ each independently represent a $C_1$ to $C_{12}$ alkyl group, a $C_6$ to $C_{12}$ aryl group, a group represented by —$(CH_2)_m$—$OR^9$ (where $R^9$ is a $C_1$ to $C_4$ alkyl group, and m is 1 to 4), a group represented by —$(CH_2)_n$—OH (where n is an integer of 1 to 4), a group represented by —$(CH_2)$ p-OC(=O)$R^{10}$ (where $R^{10}$ is a $C_1$ to $C_4$ alkyl group, and p is 1 to 4), or —$(CH_2)_q$—$Y^1$ (where $Y^1$ is a halogen element, and q is 1 to 4), and X is a monovalent anion).

[8] The composite material according to any one of [1] to [7], wherein the plurality of polymer chains is covalently fixed onto the substrate.

[9] The composite material according to [8], wherein the plurality of polymer chains has a molecular weight distribution (Mw/Mn) of 1.5 or less.

[10] The composite material according to [8] or [9], wherein the area coverage of the plurality of polymer chains is 10% or more of the area of the substrate surface.

[11] The composite material according to any one of [8] to [10], wherein a layer containing the plurality of polymer chains and the mixture is formed on the substrate, the layer having a thickness of 500 nm or more.

[12] The composite material according to any one of [1] to [11], wherein the plurality of polymer chains are polymer graft chains branched from a main polymer chain.

[13] The composite material according to any one of [1] to [12], wherein the plurality of polymer chains forms a cross-linked structure.

[14] The composite material according to any one of [1] to [13], wherein the plurality of polymer chains each have an ionically dissociable group.

[15] The composite material according to any one of [1] to [14], wherein the hydrogen bond-donating compound is at least one selected from the group consisting of aliphatic polyhydric alcohols, urea compounds, and imidazole compounds.

Effects of Invention

The present invention can provide a composite material having low friction sliding properties.

DESCRIPTION OF EMBODIMENTS

The composite material according to the present invention comprises a plurality of polymer chains fixed to a substrate and swelled with a mixture which contains a salt and a hydrogen bond-donating compound and has a melting point maintained at 100° C. or less.

The composite material according to the present invention having such a configuration can function as a tribology system material with softness and resilience (SRT material).

First Embodiment

First, a first embodiment of the present invention will be described.

Figure 1:
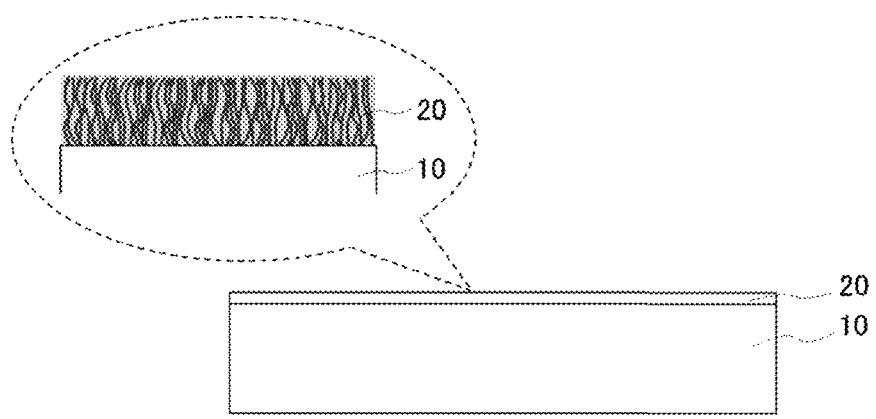
FIG. 1 is a schematic view showing one example of the composite material according to a first embodiment of the present invention.

FIG. 1 is a schematic view showing the composite material according to the first embodiment of the present invention. As shown in FIG. 1, the composite material according to the first embodiment of the present invention consist of a base 10, and a polymer brush layer 20 formed on the base 10.

For the base 10, any material can be appropriately selected from organic materials, inorganic materials, metallic materials, and the like without limitation.

Examples of the material for forming the base 10 include: polyurethane materials, polyvinyl chloride materials, polystyrene materials, polyolefin materials, PMMA, PET, cellulose acetate, silica, inorganic glass, paper, plastic laminate films, and ceramics (such as composite ceramics such as alumina ceramics, bio ceramics, and zirconia-alumina composite ceramics);

metals (such as aluminum, zinc, copper, and titanium), metal-deposited paper, silicon, silicon oxide, silicon nitride, polycrystalline silicon, and composite materials thereof;

hydrophobic organic materials such as polyolefins (such as polyethylene, polypropylene, polyisobutylene, ethylene-alpha-olefin copolymers), silicon polymers, acrylic polymers (such as polyacrylonitrile, poly(methyl methacrylate), poly(ethyl methacrylate), and poly(ethyl acrylate)), fluoropolymers (poly(tetrafluoroethylene), chlorotrifluoroethylene, fluorinated ethylene-propylene, and poly(vinyl fluoride)), vinyl polymers (such as poly(vinyl chloride), poly(vinyl methyl ether), polystyrene, poly(vinyl acetate), and poly(vinyl ketone)), vinyl monomer-containing copolymers (such as ABS), natural and synthetic rubbers (latex rubbers, butadiene-styrene copolymers, polyisoprene, polybutadiene, butadiene-acrylonitrile copolymers, polychloroprene polymers, polyisobutylene rubbers, ethylene-propylene diene copolymers, and polyisobutylene-isoprene), polyurethanes (such as polyether urethane, polyester urethane, polycarbonate urethane, and polysiloxane urethane), polyamides (such as nylon 6, nylon 66, nylon 10, and nylon 11), polyester, epoxy polymers, celluloses, modified celluloses, and copolymers thereof;

hydrophilic organic materials such as hydrophilic acrylic polymers (such as polyacrylamide, poly(2-hydroxyethyl acrylate), poly(N,N-dimethylacrylamide), poly(acrylic acid), and poly(methacrylic acid)), hydrophilic vinyl polymers (such as poly(N-vinylpyrrolidone) and poly(vinylpyridine)), poly(maleic acid), poly(2-hydroxyethyl fumarate), maleic anhydride, poly(vinyl alcohol), and copolymers thereof; and the like.

The base 10 can be in any form, and examples thereof include those of tubes, sheets, fibers, strips, films, plates, foils, membranes, pellets, powder, formed articles (such as extruded articles and casted articles), and the like.

For example, if the composite material according to the first embodiment is used in seal applications, the base 10 is preferably composed of rubber (applications to oil seals) or an inorganic oxide (applications to mechanical seals).

If the composite material according to the first embodiment is used in bearing applications, the base 10 is preferably composed of a metal (such as SUS, SUJ2, or carbon steel) or a resin (such as polyethylene).

If the composite material according to the first embodiment is used in applications to guides (guiding mechanisms), the base 10 is preferably composed of a metal (such as SUS, SUJ2, or carbon steel) or a resin (such as polyphenylene sulfide or polytetrafluoroethylene).

If the composite material according to the first embodiment is used in sliding members, the base 10 is preferably composed of an iron or iron alloy material such as cast iron, steel, or stainless steel, a non-iron metal such as aluminum or copper, a non-iron alloy thereof, or a non-metal material such as silicon wafer, glass, or quartz.

The polymer brush layer 20 is formed of a plurality of polymer chains covalently fixed to the base 10 as the substrate and swelled with a mixture which contains a salt and a hydrogen bond-donating compound and has a melting point maintained at 100° C. or less. In the first embodiment, the plurality of polymer chains may be a plurality of polymer graft chains.

In the first embodiment, the mixture of a salt and a hydrogen bond-donating compound (hereinafter, referred to as "salt-hydrogen bond donor mixture" in some cases) having a melting point maintained at 100° C. or less is used as a swelling agent for swelling the polymer chains forming the polymer brush layer 20. This mixture can reduce the coefficient of friction of the polymer brush layer 20 to provide improve low friction sliding properties. Owing to the improved low friction sliding properties, the resulting composite material can be suitably used as a variety of sealing materials or as sliding members or materials used in sliding parts of a variety of apparatuses.

The salt-hydrogen bond donor mixture used in the first embodiment can be any mixture as long as it contains a salt and a hydrogen bond-donating compound and has a melting point maintained at 100° C. or less, and is not particularly limited. Preferred is a mixture of a salt solid at normal temperature (25° C.) and a hydrogen bond-donating compound solid or liquid at normal temperature (25° C.).

The salt solid at a normal temperature (25° C.) as a constituent of the salt-hydrogen bond donor mixture can be any salt, and organic salts and inorganic salts can be used without limitation. Specific examples thereof suitably include ammonium salts represented by General Formula (1) and phosphonium salts represented by General Formula (2). These salts which are solid at normal temperature (25° C.) may be used alone or in combination.

[Chem. 2]

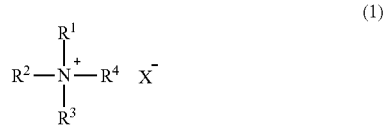

(1)

In General Formula (1) above, $R^1$ to $R^4$ each independently represent a $C_1$ to $C_{12}$ alkyl group, a $C_6$ to $C_{12}$ aryl group, a group represented by $-(CH_2)_m-OR^9$ (where $R^9$ is a $C_1$ to $C_4$ alkyl group, and m is 1 to 4), a group represented by $-(CH_2)_n-OH$ (where n is an integer of 1 to 4), a group represented by $-(CH_2)_p-OC(=O)R^{10}$ (where $R^{10}$ is a $C_1$ to $C_4$ alkyl group, and p is 1 to 4), or $-(CH_2)_q-Y^1$ (where $Y^1$ is a halogen element, and q is 1 to 4), and X is a monovalent anion.

The $C_1$ to $C_{12}$ alkyl group may be linear, branched, or cyclic, and examples thereof include methyl, ethyl, n-propyl, isopropyl, cyclopropyl, n-butyl, s-butyl, isobutyl, t-butyl, cyclobutyl, n-pentyl, n-hexyl, n-heptyl, n-octyl, n-nonyl, n-decyl, n-undecyl, n-dodecyl, cyclopentyl, and cyclohexyl groups, and the like. These may be optionally substituted. Among these, preferred are $C_1$ to $C_6$ alkyl groups, more preferred are $C_1$ to $C_4$ alkyl groups, still more preferred are a methyl group or a n-butyl group, and particularly preferred is a methyl group.

Examples of the $C_6$ to $C_{12}$ aryl group include a phenyl group, a benzyl group, a tolyl group, a xylyl group, a naphthyl group, a biphenyl group, and the like. These may be optionally substituted.

Examples of the group represented by $-(CH_2)_m-OR^9$ (where $R^9$ is a $C_1$ to $C_4$ alkyl group, and m is 1 to 4) include methoxymethyl, ethoxymethyl, propoxymethyl, butoxymethyl, methoxyethyl, ethoxyethyl, propoxyethyl, butoxyethyl, methoxypropyl, ethoxypropyl, methoxybutyl, and ethoxybutyl groups, and the like. Among these, preferred are a methoxyethyl group and an ethoxyethyl group.

Examples of the group represented by $-(CH_2)_n-OH$ (where n is integer of 1 to 4) include a hydroxymethyl group, a 2-hydroxyethyl group, a 2-hydroxypropyl group, a 3-hydroxypropyl group, a 2-hydroxybutyl group, a 3-hydroxybutyl group, a 4-hydroxybutyl group, and the like. Among these, preferred are those where n is 1 or 2, and more preferred is a 2-hydroxyethyl group.

Examples of the group represented by group represented by $-(CH_2)_p-OC(=O)R^{10}$ (where $R^{10}$ is a $C_1$ to $C_4$ alkyl group, and p is 1 to 4) include a methyl acetate group ($-CH_2-OC(=O)$ $CH_3$), an ethyl acetate group ($-C_2H_4-OC(=O)$ $CH_3$), a propyl acetate group ($-C_3H_6-OC(=O)$ $CH_3$), a butyl acetate group ($-C_4H_8-OC(=O)$ $CH_3$), a methyl propionate group ($-CH_2-OC(=O)$ $C_2H_5$), an ethyl propionate group ($-C_2H_4-OC(=O)$ $C_2H_5$), a propyl propionate group ($-C_3H_6-OC(=O)$ $C_2H_5$), a butyl propionate group ($-C_4H_8-OC(=O)$ $C_2H_5$), and the like. Among these, preferred is an ethyl acetate group ($-C_2H_4-OC(=O)CH_3$).

Examples of the group represented by $-(CH_2)_q-Y^1$ (where $Y^1$ is an halogen element, and q is 1 to 4) include a methyl fluoride group, a methyl chloride group, a methyl bromide group, a methyl iodide group, a 2-ethyl fluoride group, a 2-ethyl chloride group, a 2-ethyl bromide group, a 2-ethyl iodide group, a 3-propyl fluoride group, a 3-propyl chloride group, a 3-propyl bromide group, a 3-propyl iodide group, and the like. Among these, a 2-ethyl chloride group is preferred.

$X^-$ represents a monovalent anion. Examples of the monovalent anion include, but should not be limited to, $Cl^-$, $Br^-$, $I^-$, $AlCl_4^-$, $Al_2Cl_7^-$, $BF_4^-$, $CF_3BF_3^-$, $C_2F_5BF_3^-$, $PF_6^-$, $AsF_6^-$, $SbF_6^-$, $AlCl_4^-$, $HSO_4^-$, $ClO_4^-$, $CH_3SO_3^-$, $CF_3SO_3^-$, $CF_3CO_2^-$, $(CF_3SO_2)_2N^-$, and the like. Among these, halogen anions such as $Cl^-$, $Br^-$, and $I^-$ are preferred, and Cl is particularly preferred.

[Chem. 3]

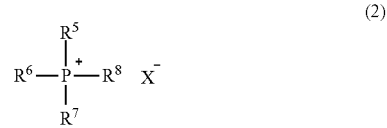

(2)

In General Formula (2), $R^5$ to $R^8$ each independently represent a $C_1$ to $C_{12}$ alkyl group, a $C_6$ to $C_{12}$ aryl group, a group represented by $-(CH_2)_m-OR^9$ (where $R^9$ is a $C_1$ to $C_4$ alkyl group, and m is 1 to 4), a group represented by $-(CH_2)_n-OH$ (where n is an integer of 1 to 4), a group represented by $-(CH_2)_p-OC(=O)R^{10}$ (where $R^{10}$ is a $C_1$ to $C_4$ alkyl group, and p is 1 to 4), or a group represented by $-(CH_2)_q-Y^1$ (where $Y^1$ is an halogen element, and q is 1 to 4). Specific examples thereof include those listed for $R^1$ to $R^4$ in General Formula (1) above. X represents a monovalent anion. Specific examples thereof include those listed in General Formula (1) above.

In the first embodiment, to enable a further reduction in coefficient of friction of the polymer brush layer 20 and provide improved low friction sliding properties, among the ammonium salts represented by General Formula (1) or the phosphonium salts represented by General Formula (2), preferred is an ammonium salt represented by General Formula (3):

[Chem. 4]

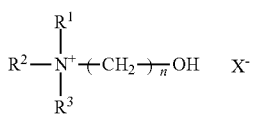

(3)

In General Formula (3), $R^1$ to $R^3$, $X^-$, and n are the same as those in General Formula (1). Preferably, $R^1$ to $R^3$ are each independently a methyl group or an ethyl group. Particularly preferably, $R^1$ to $R^3$ are all a methyl group. Moreover, n is preferably 1 or 2, particularly preferably 2. $X^-$ is preferably a halogen anion, particularly preferably $Cl^-$.

The salt solid at normal temperature (25° C.) is suitably an ammonium salt represented by General Formula (1) where $R^1$ to $R^4$ all are a $C_1$ to $C_{12}$ alkyl group, preferably that where $R^1$ to $R^4$ all are a $C_1$ to $C_6$ alkyl group, particularly preferably that where $R^1$ to $R^4$ all are the same alkyl group. In this case, examples of $R^1$ to $R^4$ include methyl, ethyl, n-propyl, isopropyl, cyclopropyl, n-butyl, s-butyl, isobutyl, t-butyl, cyclobutyl, n-pentyl, n-hexyl, n-heptyl, and n-octyl groups, and the like. Among these, preferred are $C_4$ alkyl groups such as a n-butyl group, a s-butyl group, an isobutyl group, a t-butyl group, and a cyclobutyl group, and more preferred is a n-butyl group.

Furthermore, if a phosphonium salt represented by General Formula (2) is used as the salt which is solid at normal temperature (25° C.), preferably, $R^5$ to $R^8$ all are a $C_1$ to $C_{12}$ alkyl group, more preferably, $R^5$ to $R^8$ all are a $C_1$ to $C_6$ alkyl group, and particularly preferably $R^5$ to $R^8$ all are the same alkyl group. In this case, examples of $R^5$ to $R^8$ include methyl, ethyl, n-propyl, isopropyl, cyclopropyl, n-butyl, s-butyl, isobutyl, t-butyl, cyclobutyl, n-pentyl, n-hexyl, n-heptyl, and n-octyl groups, and the like. Among these, preferred are $C_4$ alkyl groups such as a n-butyl group, a s-butyl group, an isobutyl group, a t-butyl group, and a cyclobutyl group, and more preferred is a n-butyl group.

The salt solid at normal temperature (25° C.) may be an inorganic salt, and examples of the inorganic salt include metal halide salts. Examples of metal halide salts include terbium chloride, zinc chloride, zinc bromide, zirconium chloride, iron chloride, tin chloride, copper chloride, magnesium chloride, and the like. Among these, preferred is zinc oxide.

The hydrogen bond-donating compound as a constituent of the salt-hydrogen bond donor mixture can be any compound having hydrogen bond donating ability, and may be a compound solid at normal temperature (25° C.) or may be a compound liquid at normal temperature (25° C.) without limitation. Examples thereof include chain aliphatic polyhydric alcohols such as ethylene glycol, glycerol, hexanediol, 1,4-butanediol, and triethylene glycol; aromatic polyhydric alcohols such as resorcinol; saccharides such as glucose, sucrose, and xylose; sugar alcohols such as xylitol and D-sorbitol; isosorbide compounds such as D-isosorbide; urea compounds such as urea, thiourea, 1-methylurea, 1,3-dimethylurea, and 1,1-dimethylurea; amide compounds such as acetoamide, benzamide, and 2,2,2-trifluoroacetoamide; imidazole compounds such as imidazole; aliphatic monocarboxylic acids such as formic acid, acetic acid, butanoic acid, pentanoic acid, hexanoic acid, heptanoic acid, octanoic acid, nonanoic acid, decanoic acid, dodecanoic acid, tetradecanoic acid, pentadecanoic acid, hexadecanoic acid, heptadecanoic acid, octadecanoic acid, eicosanoic acid, docosanoic acid, tetracosanoic acid, hexacosanoic acid, octacosanoic acid, and triacontanoic acid; hydroxyl group-containing aliphatic monocarboxylic acids such as lactic acid, tartaric acid, ascorbic acid, and citric acid; aromatic monocarboxylic acids such as benzoic acid, cinnamic acid, trans-cinnamic acid, phenylacetic acid, and 3-phenylpropionic acid; hydroxyl group-containing aromatic monocarboxylic acids such as 4-hydroxybenzoic acid, caffeic acid, p-coumaric acid, and gallic acid; and the like.

The hydrogen bond-donating compound is preferably an aliphatic polyhydric alcohol, a urea compound, or an imidazole compound, more preferably ethylene glycol, glycerol, urea, or imidazole, still more preferably ethylene glycol, glycerol, or urea because these can further reduce the coefficient of friction of the polymer brush layer 20 and provide improved low friction sliding properties. These hydrogen bond-donating compounds may be used alone or in combination.

In the first embodiment, the salt-hydrogen bond donor mixture is a mixture composed of any combination of salts such as the above-mentioned salts which are solid at normal temperature (25° C.) and hydrogen bond-donating compounds which are solid or liquid at normal temperature (25° C.). The salt-hydrogen bond donor mixture may be a combination of a salt solid at normal temperature (25° C.) and a hydrogen bond-donating compound solid at normal temperature (25° C.), or may be a combination of a salt solid at normal temperature (25° C.) and a hydrogen bond-donating compound liquid at normal temperature (25° C.).

In the first embodiment, a mode (1) or (2) below is preferred because the coefficient of friction of the polymer brush layer 20 can be further reduced and low friction sliding properties can be improved.

Specifically, as the mode (1), it is preferred that the melting point ($T_{m\_mixture}$) of the salt-hydrogen bond donor mixture be maintained at 100° C. or less by selecting a combination of the salt and the hydrogen bond-donating compound such that the melting point of the salt-hydrogen bond donor mixture is lower than the melting point ($T_{m\_salt}$) of the constituent salt itself and the melting point ($T_{m\_donor}$) of the constituent hydrogen bond-donating compound itself (namely, $T_{m\_mixture} < T_{m\_salt}$ and $T_{m\_mixture} < T_{m\_donor}$). In other words, the salt and the hydrogen bond-donating compound are preferably selected such that if the salt has a melting point of 200° C. and the hydrogen bond-donating compound has a melting point of 70° C., mixing of these results in a salt-hydrogen bond donor mixture having a melting point of less than 70° C. In this case, if two or more of the salts and/or the hydrogen bond-donating compounds are used in combination, it is preferred that the salt-hydrogen bond donor mixture be controlled to have a melting point lower than those of all the salts and all the hydrogen bond-donating compounds constituting the salt-hydrogen bond donor mixture.

Alternatively, as the mode (2), it is preferred that the melting point of the salt-hydrogen bond donor mixture be maintained at 100° C. or less as a result of mixing the salt with the hydrogen bond-donating compound to provide lowering of a eutectic melting point (to cause an eutectic reaction that provides a reduced melting point). Such a mixture having a melting point maintained at 100° C. or less as a result of mixing the salt with the hydrogen bond-donating compound to provide lowering of a eutectic melting point may be that called a deep eutectic solvent. In the mode (2), any combination of the salt with the hydrogen bond-donating compound can be used as long as the mixing of these provides lowering of a eutectic melting point. Preferably, the salt and the hydrogen bond donor are selected such that as a result of lowering of a eutectic melting point, the salt-hydrogen bond donor mixture is controlled to have a melting point ($T_{m\_mixture}$) lower than the melting point ($T_{m\_salt}$) of the salt itself and the melting point ($T_{m\_donor}$) of the hydrogen bond-donating compound itself ($T_{m\_mixture}<T_{m\_salt}$ and $T_{m\_mixture}<T_{m\_donor}$) as in the mode (1).

In mixing of the salt and the hydrogen bond-donating compound which are solid at normal temperature, examples of the method of preparing the salt-hydrogen bond donor mixture include, but should not be limited to, a method of weighing the salt and the hydrogen bond-donating compound, placing these into a mortar, mixing these while crushing bulks, thereafter, placing the product into a glass vessel with a stirrer, and mixing the product under heat at about 70° C.; and the like. Depending on selected solids, examples of the method of preparing the salt-hydrogen bond donor mixture include a method of preparing the salt-hydrogen bond donor mixture by only mixing the salt and the hydrogen bond-donating compound in a mortar or like (namely, without applying heat at about 70° C.) to cause the eutectic reaction (such as a method of preparing a mixture at normal temperature by mixing); and the like. On the other hand, examples of methods involving dissolving the salt and the hydrogen bond-donating compound in a solvent include a method of mixing the salt with the hydrogen bond-donating compound in a volatile solvent such as methanol, ethanol, acetone, or water, and removing the solvent (preferably, a method of causing the eutectic reaction in the course of mixing in the solvent or removing the solvent). Any method may be appropriately selected. In particular, the salt-hydrogen bond donor mixture used in the first embodiment can be easily prepared by mixing in a volatile solvent, thus leading to low cost. In addition, the salt-hydrogen bond donor mixture is prepared from the above-mentioned salt solid at normal temperature (25° C.) and the above-mentioned hydrogen bond-donating compound solid or liquid at normal temperature (25° C.), and usually has low volatility and ignition retardancy.

For the proportion of the salt and the hydrogen bond-donating compound in the salt-hydrogen bond donor mixture, the molar ratio of "salt:hydrogen bond-donating compound" is preferably 1:0.5 to 1:12, more preferably 1:0.5 to 1:8, still more preferably 1:0.5 to 1:5, still more preferably 1:0.5 to 1:3.5, further still more preferably 1:1.5 to 1:3.5, particularly preferably 1:1.7 to 1:2.5, most preferably 1:1.8 to 1:2.2. By controlling the proportion of the salt and the hydrogen bond-donating compound within this range, the melting point of the salt-hydrogen bond donor mixture can be effectively reduced. Thereby, the coefficient of friction of the polymer brush layer 20 can be further reduced when the mixture is applied to the polymer brush layer 20, resulting in improved low friction sliding properties.

The melting point of the salt-hydrogen bond donor mixture is maintained at 100° C. or less, and is preferably 70° C. or less, more preferably 40° C. or less, still more preferably normal temperature (25° C.) or lower. In other words, the salt-hydrogen bond donor mixture is suitably a liquid at normal temperature, and is especially that having a melting point of 15° C. or less, particularly preferably that having a melting point of 0° C. or less. If the salt-hydrogen bond donor mixture is liquid at normal temperature, it may be a liquid not having a melting point.

Furthermore, in the first embodiment, a different component other than the salt and the hydrogen bond-donating compound (hereinafter, referred to as "third component") may be dissolved in the salt-hydrogen bond donor mixture.

Such a third component may be a component having compatibility with the salt and the hydrogen bond-donating compound described above, and is not particularly limited. It is preferred that the salt, the hydrogen bond-donating compound, and the different component can be homogeneously dissolved into a homogeneous mixture. Such a mixture prepared by homogeneously dissolving these components can be uniformly applied to the polymer chains forming the polymer brush layer 20, resulting a uniform swelled structure. In the case in which such a different component is contained, adsorbed water may be present as long as solubility can be ensured.

Examples of the third component include water, alcohols [such as alkanols (such as methanol, ethanol, 1-propanol, isopropanol, n-butanol, 2-butanol, and isobutanol), alkane diols (such as ethylene glycol and propylene glycol), alkane triols (such as glycerol), low molecular weight polyalkylene glycols (such as diethylene glycol and triethylene glycol)], ketones (such as acetone and dialkyl ketones), ethers, ionic liquids, and the like. These materials may be used alone or in combination, and preferred are materials which can adjust the viscosity of the salt and the hydrogen bond-donating compound.

If the different component is contained in the salt-hydrogen bond donor mixture, the proportion of the different component is not particularly limited, and is preferably 0.1 to 75% by weight, more preferably 1 to 50% by weight relative to 100% by weight of the entire salt-hydrogen bond donor mixture (i.e., the total of the salt, the hydrogen bond-donating compound, and the different component).

In the first embodiment, the polymer brush layer 20 shown in FIG. 1 can be formed by introducing a plurality of polymer chains onto the surface of the base 10 described above by surface-initiated living radical polymerization, and swelling the plurality of polymer chains introduced as above with the salt-hydrogen bond donor mixture described above. In this time, the salt-hydrogen bond donor mixture described above may be a single mixture or may include a combination of mixtures. In addition to the salt-hydrogen bond donor mixture described above, an additional medium may be used in combination as a swelling agent. Examples of the additional medium include ionic liquids, organic solvents, lubricant oils, and the like. The amount of the additional medium may be appropriately set in the range not inhibiting the advantageous effects of the present invention.

In surface-initiated living radical polymerization, polymerization initiating groups are introduced to the surface of the base 10 as start points of polymer chains, and living radical polymerization is caused to take place from the polymerization initiating groups as the start points to form polymer chains. For example, the methods described in JP-A 2009-59659 and JP-A 2010-218984 can be used.

The polymer chains may be formed of any of a hydrophobic polymer and a hydrophilic polymer. The hydrophilic polymer may be prepared from a hydrophilic monomer, or may be prepared by preparing a polymer from a hydrophobic monomer, and thereafter introducing a hydrophilic group to the polymer. The polymer chains may be a homopolymerized product of one monomer, or may be a copolymerized product of two or more monomers. The copolymerization process may be any of random copolymerization, block copolymerization, gradient copolymerization, and the like.

Any monomer can be used to form the polymer chains without limitation. Preferred is a monomer having at least one addition-polymerizable double bond. Preferred examples of monofunctional monomers having one addition-polymerizable double bond include (meth)acrylic monomers, styrene monomers, and the like.

Examples of the monomers for forming the polymer chains include (meth)acrylic monomers, styrene monomers, monofunctional monomers having one addition-polymerizable double bond, hydrophobic monomers, hydrophilic monomers, monomers having a side chain containing a carboxyl group or a group readily convertible to a carboxyl group, and the like.

Specific examples of the (meth)acrylic monomers include: (meth)acrylic acid, methyl (meth)acrylate, ethyl (meth)acrylate, propyl (meth)acrylate, isopropyl (meth) acrylate, butyl (meth)acrylate, isobutyl (meth)acrylate, tert-butyl (meth)acrylate, pentyl (meth)acrylate, hexyl (meth) acrylate, and cyclohexyl (meth)acrylate;

heptyl (meth)acrylate, octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, and benzyl (meth)acrylate;

2-methoxyethyl (meth)acrylate, 3-methoxypropyl (meth) acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, and 3-ethyl-3-(meth)acryloyloxymethyloxetane;

2-(meth)acryloyloxyethyl isocyanate, 2-aminoethyl (meth) acrylate, 2-(2-bromopropionyloxy)ethyl (meth)acrylate, and 2-(2-bromoisobutyryloxy)ethyl (meth)acrylate;

1-(meth)acryloxy-2-phenyl-2-(2,2,6,6-tetramethyl-1-piperidinyloxy)ethane, 1-(4-((4-(meth)acryloxy)ethoxyethyl)phenylethoxy)piperidine, and γ-(methacryloyloxypropyl)trimethoxysilane;

3-(3,5,7,9,11,13,15-heptaethylpentacyclo[9.5.1.1$^{3,9}$.1$^{5,15}$.1$^{7,13}$]octasiloxan-1-yl)propyl (meth)acrylate, 3-(3,5,7,9,11,13,15-heptaisobutyl-pentacyclo[9.5.1.1$^{3,9}$.1$^{5,15}$.1$^{7,13}$] octasiloxan-1-yl) propyl (meth)acrylate, and 3-(3,5,7,9,11,13,15-heptaisooctylpentacyclo[9.5.1.1$^{3,9}$.1$^{5,15}$.1$^{7,13}$]octasiloxan-1-yl)propyl (meth)acrylate;

3-(3,5,7,9,11,13,15-heptacyclopentylpentacyclo[9.5.1.1$^{3,9}$.1$^{5,15}$.1$^{7,13}$]octasiloxan-1-yl)propyl (meth)acrylate, 3-(3,5,7,9,11,13,15-heptaphenylpentacyclo[9.5.1.1$^{3,9}$.1$^{5,15}$.1$^{7,13}$]octasiloxan-1-yl)propyl (meth)acrylate, and 3-[(3,5,7,9,11,13,15-heptaethylpentacyclo[9.5.1.1$^{3,9}$.1$^{5,15}$.1$^{7,13}$]octasiloxan-1-yloxy)dimethylsilyl]propyl (meth)acrylate;

3-[(3,5,7,9,11,13,15-heptaisobutylpentacyclo[9.5.1.1$^{3,9}$.1$^{5,15}$.1$^{7,13}$]octasiloxan-1-yloxy)dimethylsilyl]propyl (meth)acrylate, and 3-[(3,5,7,9,11,13,15-heptaisooctylpentacyclo[9.5.1.1$^{3,9}$.1$^{5,15}$.1$^{7,13}$]octasiloxan-1-yloxy)dimethylsilyl]propyl (meth)acrylate;

3-[(3,5,7,9,11,13,15-heptacyclopentylpentacyclo[9.5.1.1$^{3,9}$.1$^{5,15}$.1$^{7,13}$] octasiloxan-1-yloxy)dimethylsilyl]propyl (meth)acrylate, and 3-[(3,5,7,9,11,13,15-heptaphenylpentacyclo[9.5.1.1$^{3,9}$.1$^{5,15}$.1$^{7,13}$]octasiloxan-1-yloxy)dimethylsilyl]propyl (meth)acrylate;

(meth)acrylic acid-ethylene oxide adducts, trifluoromethylmethyl (meth)acrylate, 2-trifluoromethylethyl (meth) acrylate, 2-perfluoroethylethyl (meth)acrylate, 2-perfluoroethyl-2-perfluorobutylethyl (meth)acrylate, 2-perfluoroethyl (meth)acrylate, trifluoromethyl (meth) acrylate, and diperfluoromethylmethyl (meth)acrylate;

2-perfluoromethyl-2-perfluoroethylethyl (meth)acrylate, 2-perfluorohexylethyl (meth)acrylate, 2-perfluorodecylethyl (meth)acrylate, and 2-perfluorohexadecylethyl (meth)acrylate; and the like.

Specific examples of the styrene monomers include:

styrene, vinyltoluene, α-methylstyrene, p-chlorostyrene, p-chloromethylstyrene, m-chloromethylstyrene, o-aminostyrene, p-styrene chlorosulfonic acid, styrenesulfonic acid and salts thereof, vinyl phenyl methyl dithiocarbamate, 2-(2-bromopropionyloxy)styrene, and 2-(2-bromoisobutyryloxy)styrene;

1-(2-((4-vinylphenyl)methoxy)-1-phenylethoxy)-2,2,6,6-tetramethylpiperidine, 1-(4-vinylphenyl)-3,5,7,9,11,13,15-heptaethylpentacyclo[9.5.1.1$^{3,9}$.1$^{5,15}$.1$^{7,13}$]octasiloxane, and 1-(4-vinylphenyl)-3,5,7,9,11,13,15-heptaisobutyl-pentacyclo[9.5.1.1$^{3,9}$.1$^{5,15}$.1$^{7,13}$]octasiloxane;

1-(4-vinylphenyl)-3,5,7,9,11,13,15-heptaisooctylpentacyclo[9.5.1.1$^{3,9}$.1$^{5,15}$.1$^{7,13}$]octasiloxane, 1-(4-vinylphenyl)-3,5,7,9,11,13,15-heptacyclopentylpentacyclo[9.5.1.1$^{3,9}$.1$^{5,15}$.1$^{7,13}$] octasiloxane, and 1-(4-vinylphenyl)-3,5,7,9,11,13,15-heptaphenylpentacyclo[9.5.1.1$^{3,9}$.1$^{5,15}$.1$^{7,13}$]octasiloxane;

3-(3,5,7,9,11,13,15-heptaethylpentacyclo[9.5.1.1$^{3,9}$.1$^{5,15}$.1$^{7,13}$]octasiloxan-1-yl)ethylstyrene, 3-(3,5,7,9,11,13,15-heptaisobutylpentacyclo[9.5.1.1$^{3,9}$.1$^{5,15}$.1$^{7,13}$] octasiloxan-1-yl)ethylstyrene, and 3-(3,5,7,9,11,13,15-heptaisooctylpentacyclo[9.5.1.1$^{3,9}$.1$^{5,15}$.1$^{7,13}$]octasiloxan-1-yl)ethylstyrene;

3-(3,5,7,9,11,13,15-heptacyclopentylpentacyclo[9.5.1.1$^{3,9}$.1$^{5,15}$.1$^{7,13}$] octasiloxan-1-yl)ethylstyrene, 3-(3,5,7,9,11,13,15-heptaphenylpentacyclo[9.5.1.1$^{3,9}$.1$^{5,15}$.1$^{7,13}$]octasiloxan-1-yl)ethylstyrene, and 3-(3,5,7,9,11,13,15-heptaethylpentacyclo[9.5.1.1$^{3,9}$.1$^{5,15}$.1$^{7,13}$]octasiloxan-1-yloxy)dimethylsilyl)ethylstyrene;

3-(3,5,7,9,11,13,15-heptaisobutylpentacyclo[9.5.1.1$^{3,9}$.1$^{5,15}$.1$^{7,13}$]octasiloxan-1-yloxy)dimethylsilyl)ethylstyrene, and 3-(3,5,7,9,11,13,15-heptaisooctylpentacyclo[9.5.1.1$^{3,9}$.1$^{5,15}$.1$^{7,13}$]octasiloxan-1-yloxy)dimethylsilyl) ethylstyrene;

3-((3,5,7,9,11,13,15-heptacyclopentylpentacyclo[9.5.1.1$^{3,9}$.1$^{5,15}$.1$^{7,13}$] octasiloxan-1-yloxy)dimethylsilyl)ethylstyrene, and 3-((3,5,7,9,11,13,15-heptaphenylpentacyclo[9.5.1.1$^{3,9}$.1$^{5,15}$.1$^{7,13}$]octasiloxan-1-yloxy)dimethylsilyl) ethylstyrene; and the like.

Specific examples of the monofunctional monomers having one addition-polymerizable double bond include:

fluorine-containing vinyl monomers (such as perfluoroethylene, perfluoropropylene, and vinylidene fluoride), silicon-containing vinyl monomers (such as vinyltrimethoxysilane and vinyltriethoxysilane), maleic anhydride, maleic acid, monoalkyl esters and dialkyl esters of maleic acid, fumaric acid, and monoalkyl esters and dialkyl esters of fumaric acid;

maleimide monomers (such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide);

nitrile group-containing monomers (such as acrylonitrile and methacrylonitrile), amide group-containing monomers (such as acrylamide and methacrylamide), vinyl ester monomers (such as vinyl acetate, vinyl propionate, vinyl pivalate, vinyl benzoate, and vinyl cinnamate);

olefins (such as ethylene and propylene), conjugated diene monomers (such as butadiene and isoprene), vinyl halides (such as vinyl chloride), vinylidene halides (such as vinylidene chloride), and allyl halides (such as allyl chlorides);

allyl alcohols, vinylpyrrolidone, vinylpyridine, N-vinylcarbazole, methyl vinyl ketone, and vinyl isocyanate; and the like.

Usable monofunctional monomers having one addition-polymerizable double bond also include macromonomers having one polymerizable double bond in one molecule and having a main chain derived from styrene, a (meth)acrylate ester, siloxane, or the like.

Specific examples of the hydrophobic monomers include:
acrylate esters (such as alkyl esters of acrylic acid such as methyl acrylate, ethyl acrylate, propyl acrylate, butyl acrylate, cyclohexyl acrylate, and hexafluoroisopropyl acrylate; aryl acrylates such as phenyl acrylate; arylalkyl acrylates such as benzyl acrylate; and alkoxyalkyl acrylates such as methoxymethyl acrylate);
methacrylate esters (such as alkyl esters of methacrylic acid such as methyl methacrylate, ethyl methacrylate, propyl methacrylate, butyl methacrylate, cyclohexyl methacrylate, and hexafluoroisopropyl methacrylate; aryl methacrylates such as phenyl methacrylate; arylalkyl methacrylates such as benzyl methacrylate; and alkoxyalkyl methacrylates such as methoxymethyl methacrylate);
fumarate esters (such as alkyl esters of fumaric acid such as dimethyl fumarate, diethyl fumarate, and diallyl fumarate), maleate esters (such as alkyl esters of maleic acid such as dimethyl maleate, diethyl maleate, and diallyl maleate);
itaconate esters (such as alkyl esters of itaconic acid), crotonate esters (such as alkyl esters of crotonic acid), methyl vinyl ether, ethoxyethyl vinyl ether, vinyl acetate, vinyl propionate, vinyl benzoate, and styrene;
alkyl styrenes, vinyl chloride, vinyl methyl ketone, vinyl stearate, and vinyl alkyl ethers; and the like.

Specific examples of the hydrophilic monomers include:
hydroxy-substituted alkyl acrylates (such as 2-hydroxyethyl acrylate, 2-hydroxypropyl acrylate, 2-hydroxypropyl acrylate, 2,3-dihydroxypropyl acrylate, poly(ethoxyethyl acrylate), and poly(ethoxypropyl acrylate));
hydroxy-substituted alkyl methacrylates (such as 2-hydroxyethyl methacrylate, 2-hydroxypropyl methacrylate, 2-hydroxypropyl methacrylate, 2,3-dihydroxypropyl methacrylate, poly(ethoxyethyl methacrylate), and poly(ethoxypropyl methacrylate));
acrylamide, N-alkylacrylamides (such as N-methylacrylamide and N,N-dimethylacrylamide), and N-alkylmethacrylamides (such as N-methylmethacrylamide);
polyethylene glycol monoacrylate, polyethylene glycol monomethacrylate, alkoxy polyethylene glycol acrylate, alkoxy polyethylene glycol methacrylate, phenoxy polyethylene glycol acrylate, phenoxy polyethylene glycol methacrylate, and 2-glycosiloxyethyl methacrylate;
acrylic acid, methacrylic acid, fumaric acid, maleic acid, itaconic acid, crotonic acid, methacrylamide, allyl alcohols, N-vinylpyrrolidone, and N,N-dimethylaminoethyl acrylate; and the like.

Specific examples of the monomers having a side chain containing a carboxyl group or a group readily convertible to a carboxyl salt group include:
1-methoxyethyl acrylate, 1-ethoxyethyl acrylate, 1-propoxyethyl acrylate, 1-(1-methylethoxy)ethyl acrylate, 1-butoxyethyl acrylate, 1-(2-methylpropoxy)ethyl acrylate, and 1-(2-ethylhexoxy)ethyl acrylate;
pyranyl acrylate, 1-methoxyethyl methacrylate, 1-ethoxyethyl methacrylate, 1-propoxyethyl methacrylate, 1-(1-methylethoxy)ethyl methacrylate, 1-butoxyethyl methacrylate, 1-(2-methylpropoxy)ethyl methacrylate, 1-(2-ethylhexoxy)ethyl methacrylate;
pyranyl methacrylate, di-1-methoxyethyl maleate, di-1-ethoxyethyl maleate, di-1-propoxyethyl maleate, di-1-(1-methylethoxy)ethyl maleate, di-1-butoxyethyl maleate, di-1-(2-methylpropoxy)ethyl maleate, and dipyranyl maleate; and the like.

The above-mentioned monomers for forming the polymer chains may be used alone or in combination.

Among the monomers for forming the polymer chains, preferred is use of monomers having an ionically dissociable group (particularly, monomers having an ionically dissociable group and a reactive double bond group) because these have high compatibility with the above salt-hydrogen bond donor mixture and contribute to a further reduced coefficient of friction of the polymer brush layer 20 and further improved low friction sliding properties. By using such a monomer having an ionically dissociable group, polymer chains having an ionically dissociable group can be prepared through polymerization. The monomer used to form the polymer chains may include, in addition to the monomer having an ionically dissociable group, a monomer copolymerizable therewith (e.g., any of the above-mentioned monomers). Examples of such monomers having an ionically dissociable group include, but should not be limited to, compounds represented by General Formula (4) below. Use of the monomer having an ionically dissociable group enables introduction of the ionically dissociable group to each polymer chain.

[Chem. 5]

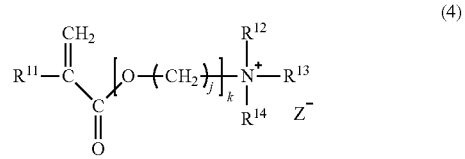

In General Formula (4), $R^{11}$ represents a hydrogen atom or a $C_1$ to $C_3$ alkyl group. $R^{12}$ to $R^{14}$ represent a $C_1$ to $C_5$ alkyl group. $R^{12}$ to $R^{14}$ may contain one or more heteroatoms selected from the group consisting of oxygen, sulfur, fluorine atoms, and $R^{12}$ to $R^{14}$ may be bonded to each other to form a ring with the nitrogen atom bonded to $R^{12}$ to $R^{14}$. $Z^-$ represents a monovalent anion. In General Formula (4), k represents an integer of 1 to l, and j represents an integer of 1 to 5.

In General Formula (4), the monovalent anion represented by Z is not particularly limited, and an anion such as $BF_4^-$, $PF_6^-$, $AsF_6^-$, $SbF_6^-$, $AlCl_4^-$, $NbF_6^-$, $HSO_4^-$, $ClO_4^-$, $CH_3SO_3^-$, $CF_3SO_3^-$, $CF_3CO_2^-$, $(CF_3SO_2^-)_2N^-$, $Cl^-$, $Br^-$, or $I^-$ can be used. These can be used alone or in combination. Considering the degree of dissociation, stability, the mobility, and the like in the salt-hydrogen bond donor mixture when the polymer chains are swelled by the salt-hydrogen bond donor mixture, more preferred is $BF_4^-$, $PF_6^-$, $(CF_3SO_2)_2N^-$, $CF_3SO_3^-$, or $CF_3CO_2^-$.

Among these compounds represented by General Formula (4), compounds represented by General Formulae (5) to (12) below can be particularly suitably used because they are more effective in reducing the coefficient of friction of the polymer brush layer 20. These can be used alone or in combination.

[Chem. 6]

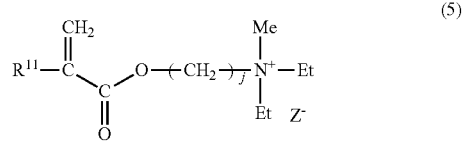

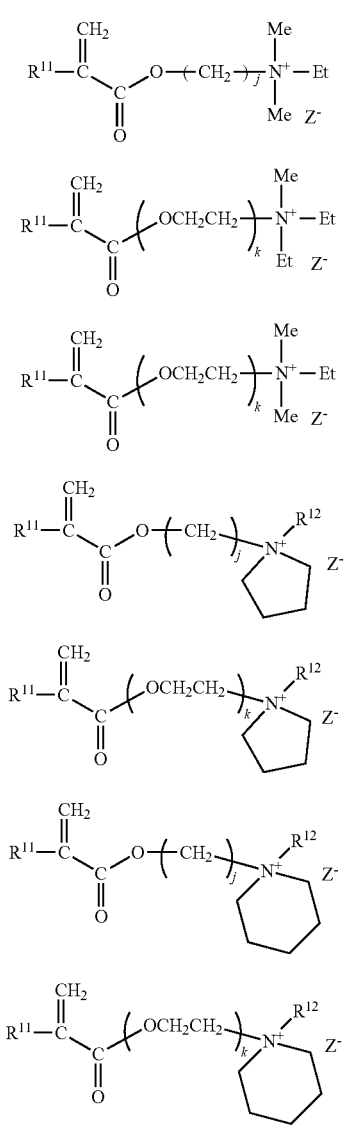

In General Formulae (5) to (12) above, $R^{11}$, $R^{12}$, $Z^-$, k, and j are as defined in General Formula (4) above.

When polymerization is performed by surface-initiated living radical polymerization, the polymerization initiating groups to be introduced to the surface of the base 10 can be any groups from which polymerization can take place, and preferred are alkyl halide groups and halogenated sulfonyl groups.

From the viewpoint of the graft density and the primary structure (molecular weight, molecular weight distribution, monomer arrangement pattern) of the grafted polymer chains, it is preferred that the polymerization initiating groups be physically or chemically bonded to the surface of the base 10.

Examples of the method of introducing (bonding) the polymerization initiating groups to the surface of the base 10 include chemical adsorption, the Langmuir-Blodgett (LB) technique, and the like.

For example, if a silicon wafer is used as the base 10, chlorosulfonyl groups (polymerization initiating groups) can be immobilized to the surface of the silicon wafer through a chemical bond by reacting 2-(4-chlorosulfonylphenyl)ethyltrimethoxysilane, 2-(4-chlorosulfonylphenyl)ethyltrichlorosilane, or the like with an oxidized layer on the surface of the silicon wafer.

When the polymerization initiating groups for surface-initiated living radical polymerization are introduced to the surface of the base 10, a polymerization initiating group-containing surface treatment agent having a polymerization initiating group and a group capable of binding to the base or a group having affinity with the base is preferably used. Such a polymerization initiating group-containing surface treatment agent may be a low-molecular-weight compound, or may be a high-molecular-weight compound.

Although not particularly limited, the polymerization initiating group-containing surface treatment agent is preferably a compound having a group capable of binding to the base 10 and a radical generating group. For example, the polymerization initiating group-containing surface treatment agents disclosed in JP-A 2010-218984, i.e., TEMPO-based, ATRP-based, RAFT-based, and RTCP-based polymerization initiating group-containing surface treatment agents can be used. Among these, TEMPO-based, RAFT-based, and RTCP-based polymerization initiating group-containing surface treatment agents are more preferred. Among these TEMPO-based polymerization initiating group-containing surface treatment agents, particularly preferred are DEPN-based polymerization initiating group-containing surface treatment agents. Examples of the group capable of binding to the base 10 include —$SiCl_3$, —$Si(CH_3)Cl_2$, —$Si(CH_3)_2Cl$, —$Si(OR')_3$ (in these formulae, R' represents a methyl group, an ethyl group, a propyl group, or a butyl group), and the like. Alternatively, the polymerization initiating group-containing surface treatment agent to be used can be (2-bromo-2-methyl)propionyloxyhexyltriethoxysilane (BHE), (2-bromo-2-methyl)propionyloxypropyltriethoxysilane (BPE), and the like disclosed in International Publication No. WO 2006/087839.

To adjust the graft density, in addition to the above polymerization initiating group-containing surface treatment agent, a silane coupling agent without a polymerization initiating group (e.g., alkyl silane coupling agent generally used) may be used in combination.

The graft density can be freely varied by adjusting the ratio between the polymerization initiating group-containing surface treatment agent and the silane coupling agent without a polymerization initiating group. From the viewpoint of uniform introduction of the polymerization initiating groups, controllability of the graft density of the polymerization initiating groups, and the like, the polymerization initiating groups can be introduced to the surface of the base 10 by a LB method or gas phase adsorption.

In the LB method, first, a film forming material is dissolved in an appropriate solvent (such as chloroform or benzene). Next, a small amount of the solution is extended on a clean liquid surface, preferably a pure water surface, and the solvent is evaporated or diffused to its adjacent aqueous phase to form a low-density film composed of film forming molecules.

Subsequently, usually, a partition plate is mechanically swept over the water surface to reduce the surface area of the water surface on which the film forming molecules are extended. Thereby, the film is compressed to increase the density. Thus, a dense monomolecular film on the water surface is obtained.

In the next step, while the surface density of the molecules which form the monomolecular film on the water surface is kept constant under an appropriate condition, a base for depositing a monomolecular layer thereon is immersed or pulled out in a direction crossing the monomolecular film on the water surface to transfer the monomolecular film on the water surface onto the base 10. Thus, the film forming molecule layer is deposited on the base.

Details and a specific example of the LB method are described in "Shinjikken Kagaku Koza (New Course of Experimental Chemistry) Vol. 18 (Interface and Colloid), Ch. 6, (1977), written by Kiyonari Fukuda et al., Maruzen Company, Limited", "LB-makuto Erekutoronikusu (LB Films and Electronics), edited by Kiyonari Fukuda, Michio Sugi, and Hiroyuki Sasabe, (1986), CMC Publishing Co., Ltd.", "Yoi LB-makuwo Tsukuru Jissentekigijutsu (Practical Techniques For Forming Good LB Films), written by Toshio Ishii, (1989), Kyoritsu Shuppan Co., Ltd.", and the like.

The polymerization initiating groups are introduced to the surface of the base 10 by a method using the above polymerization initiating group-containing surface treatment agent. The base 10 having the polymerization initiating groups introduced thereto is then immersed in a polymerization reaction solution containing the above-mentioned monomer, and is heated as needed. Thus, polymer chains containing polymerization units of the above-mentioned monomer can be formed on the surface of the base 10. Besides the above-mentioned monomer, the polymerization reaction solution can contain any components needed in the polymerization reaction, such as a variety of radical initiators and solvents.

In the first embodiment, the polymer chains are formed on the surface of the base 10 with a graft density such that the area coverage of the polymer chains in the surface area of the base 10 (occupancy ratio of the polymer chains per polymer cross-sectional area) is preferably 10% or more, more preferably 15% or more, still more preferably 20% or more. For example, the graft density can be calculated from the absolute value of the number average molecular weight (Mn) of the graft chains, the amount of the grafted polymer, and the surface area of the base 10. The area coverage of the polymer chains in the polymer brush layer 20 can be calculated by determining the cross-sectional area of the polymer from the length of the repeating units in a stretched state and the bulk density of the polymer, and multiplying the cross-sectional area by the graft density. The area coverage means the proportion of graft points (first monomers) occupying the surface of the base 10 (the highest coverage of 100%, where no longer grafting is allowed).

The graft density of the polymer chains per unit area is preferably 0.02 chains/nm$^2$ or more, more preferably 0.04 chains/nm$^2$ or more, still more preferably 0.06 chains/nm$^2$ or more, particularly preferably 0.08 chains/nm$^2$ or more.

For example, the graft density of the polymer chains can be measured by the method described in Macromolecules, 31, 5934-5936 (1998), Macromolecules, 33, 5608-5612 (2000), Macromolecules, 38, 2137-2142 (2005), or the like. Specifically, the graft density (chains/nm$^2$) can be determined by measuring the graft amount (W) and the number average molecular weight (Mn) of the graft chains, followed by calculation from the following equation:

$$\text{graft density (chains/nm}^2\text{)}=W\text{ (g/nm}^2\text{)}/Mn\times(\text{Avogadro number})$$

(where W represents the graft amount, and Mn represents the number average molecular weight).

If the base 10 is a flat base such as a silicon wafer, the graft amount (W) can be determined by measuring the dry film thickness, i.e., the thickness of the dried grafted polymer chain layer by ellipsometry, and calculating the graft amount per unit area using the density of the bulk film. Alternatively, if the base 10 is silica particles or the like, the dry film thickness can be measured by infrared absorption spectrometry (IR), thermal weight loss (TG) measurement, elemental analysis, or the like.

The polymer chains forming the polymer brush layer 20 has a number average molecular weight (Mn) of preferably 500 to 10,000,000, more preferably 100,000 to 10,000,000. To further reduce the coefficient of friction of the polymer brush layer 20 and further improve the low friction sliding properties, the molecular weight distribution (Mw/Mn) of the polymer chains forming the polymer brush layer 20 is preferably close to 1, preferably 1.5 or less, more preferably 1.3 or less, still more preferably 1.25 or less, further still more preferably 1.2 or less, particularly preferably 1.15 or less. Examples of the method of measuring the number average molecular weight (Mn) of the polymer chains and the molecular weight distribution (Mw/Mn) thereof include a method of cutting the polymer chains from the base 10 by a hydrofluoric acid treatment, and measuring the cut polymer chains by gel permeation chromatography to obtain polyethylene oxide equivalent values. Alternatively, another method can be used, in which assuming that free polymers formed during polymerization have a molecular weight equal to that of the polymer chains introduced to the base 10, the number average molecular weight (Mn) and molecular weight distribution (Mw/Mn) of the free polymers are measured by gel permeation chromatography as polyethylene oxide equivalent values, and the values are used as they are.

The average chain length $L_p$ (i.e., the polymer brush length) of the polymer chains forming the polymer brush layer 20 is preferably 10 nm or more, and from the practical viewpoint, more preferably in the range of 10 to 1000 nm. A significantly short average chain length $L_p$ of the polymer chains may result in insufficient sliding properties. The average chain length $L_p$ of the polymer chains can be adjusted by selecting the monomer for forming the polymer chains, the polymerization conditions, and the like.

In the first embodiment, examples of the method of swelling the polymer chains formed on the base 10 with the salt-hydrogen bond donor mixture include, but should not be limited to, a method of adding the salt-hydrogen bond donor mixture dropwise or applying the mixture to the polymer chains formed on the base 10, and then leaving the polymer chains, a method of immersing the base 10 having the polymer chains formed thereon into the salt-hydrogen bond donor mixture, and the like.

To further reduce the coefficient of friction of the polymer brush layer 20 and further improve the low friction sliding properties, the thickness of the polymer brush layer 20 formed in the first embodiment is 500 nm or more, preferably 700 nm or more, more preferably 800 nm or more, still more preferably 1,000 nm or more. Although not particularly limited, the upper limit of the thickness of the polymer brush layer 20 is usually 20 µm or less.

Second Embodiment

A second embodiment according to the present invention will now be described.

The composite material according to the second embodiment has the same configuration as that in the first embodiment except that the plurality of polymer chains forming the polymer brush layer 20 shown in FIG. 1 forms a cross-linked network structure. In other words, in the second embodiment, the plurality of polymer chains covalently fixed to the base 10 as a substrate forms a cross-linked network structure, and the polymer chains forming such a cross-linked network structure are swelled with the above-mentioned salt-hydrogen bond donor mixture to form the polymer brush layer 20. In the second embodiment, the plurality of polymer chains may also be a plurality of polymer graft chains.

Although the plurality of polymer chains forming the polymer brush layer 20 and forming the cross-linked network structure is not particularly limited, to provide a polymer brush layer 20 having sufficient strength, the plurality of polymer chains is preferably a double-network gel forming an interpenetrating network structure composed of two or more polymer networks. Here, the "interpenetrating network structure" indicates a structure or state in which two or more polymers having their own cross-linked network structures are physically intertwined through interpenetration of these network structures so that a plurality of network structures is formed inside the intertwined polymers. Of course, the double-network gel according to the second embodiment may be any one of a gel formed of two polymer networks, that formed of three polymer networks, and that formed of four or more polymer networks. The double-network gel according to the second embodiment may also be a gel further containing a linear polymer to form a semi-interpenetrating network structure.

Although the two or more polymer networks forming the double-network gel are not particularly limited, to appropriately increase the strength of the double-network gel when swelled with the salt-hydrogen bond donor mixture, for example, preferred is a combination of a polymer network (A) formed of an unsaturated monomer having a positively or negatively chargeable group and a polymer network (B) formed of an electrically neutral unsaturated monomer (without a positively or negatively chargeable group).

Examples of the unsaturated monomer having a positively or negatively chargeable group for forming the polymer network (A) formed of an unsaturated monomer having a positively or negatively chargeable group (hereinafter, referred to as "polymer network (A)" depending on cases) include, but should not be limited to, unsaturated monomers having an acidic group (such as a carboxyl group, a phosphate group, and a sulfonate group), those having a basic group (such as an amino group), and the like.

Specific examples of the unsaturated monomer having a positively or negatively chargeable group include:
carboxyl group-containing vinyl monomers such as (meth)acrylic acid (indicating acrylic acid and/or methacrylic acid. The same is applied below), (anhydrous) maleic acid, maleic acid monoalkyl esters, fumaric acid, fumaric acid monoalkyl esters, crotonic acid, itaconic acid, itaconic acid monoalkyl esters, itaconic acid glycol monoether, citraconic acid, citraconic acid monoalkyl esters, and cinnamic acid, and salts thereof;
sulfonate group-containing vinyl monomers such as sulfopropyl (meth)acrylate, 2-hydroxy-3-(meth)acryloxypropylsulfonic acid, 2-(meth)acryloylamino-2,2-dimethylethanesulfonic acid, 2-(meth)acryloyloxyethanesulfonic acid, 3-(meth)acryloyloxy-2-hydroxypropanesulfonic acid, and 2-acrylamide-2-methylpropanesulfonic acid, and salts thereof;
phosphate group-containing vinyl monomers such as 2-hydroxyethylacroyl phosphate, and salts thereof;
amino group-containing vinyl monomers such as aminoethyl (meth)acrylate, dimethylaminoethyl (meth)acrylate, and t-butylaminoethyl (meth)acrylate; and the like.

These monomers may be used alone or in combination.

Examples of the electrically neutral unsaturated monomer for forming the polymer network (B) formed of an electrically neutral unsaturated monomer (without a positively or negatively chargeable group) (hereinafter, referred to as "polymer network (B)" depending on cases) include dimethylsiloxane, styrene, acrylamide, methylenebisacrylamide, trimethylolpropane trimethacrylate, vinylpyridine, styrene, methyl methacrylate, fluorine-containing unsaturated monomers (such as trifluoroethyl acrylate (TFE)), hydroxyethyl acrylate, vinyl acetate, triethylene glycol dimethacrylate, and the like. These monomers may be used alone or in combination.

In the second embodiment, to appropriately increase the strength of the double-network gel when swelled with the salt-hydrogen bond donor mixture, the double-network gel is preferably a combination of a polymer network having a relatively large molecular weight between cross-linking points and a polymer network having a relatively small molecular weight between cross-linking points. In particular, to provide favorable compatibility with the salt-hydrogen bond donor mixture, the double-network gel is preferably a combination of a polymer network (C) formed of a compound represented by General Formula (4) above and listed in the first embodiment and a polymer network (D) formed of a compound other than the compound represented by General Formula (4) above.

As in the first embodiment above, the compounds represented by General Formulae (5) to (12) above can be particularly preferably used as the compound represented by General Formula (4) which is used for forming the polymer network (C). These can be used alone or in combination.

Examples of a monomer for forming the polymer network (D) include, but should not be limited to, the electrically neutral unsaturated monomers for forming the polymer network (B), which are described above, and the like.

If the plurality of polymer chains formed on the base 10 is a double-network gel, examples of the method of forming the polymer brush layer 20 on the base 10 include, but should not be limited to, a method described below. Hereinafter, a case where the double-network gel is formed of two polymer networks will be exemplified and described.

First, a compound for introducing a substituent reactive with a radical active species to the surface of the base 10 is reacted with the surface of the base 10 to introduce the substituent reactive with the radical active species to the surface of the base 10. Suitable examples of the compound for introducing a substituent reactive with a radical active species include, but should not be limited to, compounds having a substituent reactive with a radical active species and an alkoxysilyl group.

Examples of the compounds having a substituent reactive with a radical active species and an alkoxysilyl group include, but should not be limited to, alkoxysilyl group-containing amide compounds having an unsaturated bond, such as N,N-bis(3-(trimethoxysilyl) propyl) methacrylamide, N,N-bis(3-(trimethoxysilyl)propyl)acrylamide, and N,N-bis((methyldimethoxysilyl)propyl)methacrylamide;
alkoxysilyl group-containing acrylate compounds such as 3-(trimethoxysilyl)propyl methacrylate, 3-(triethoxysilyl) propyl methacrylate, 3-[tri(methoxyethoxy)silyl]propyl methacrylate, 3-(methyldimethoxysilyl)propyl methacrylate, and 3-(methyldiethoxysilyl)propyl methacrylate; and the like.

Examples of the method of reacting the compound having a substituent reactive with a radical active species and an alkoxysilyl group with the surface of the base 10 include, but should not be limited to, a method of treating the base 10 to hydrophilize the surface thereof, and reacting the hydrophilized base 10 with the compound having a substituent reactive with a radical active species and an alkoxysilyl group by immersing the hydrophilized base into a solution containing the compound. Examples of the hydrophilizing treatment include, but should not be limited to, a method involving a plasma etching treatment, and the like.

Although not particularly limited, the reaction temperature at this time is preferably 20 to 50° C., and the reaction time is 6 to 48 hours.

Subsequently, separated from above, a gel (hereinafter, referred to as "first polymer network gel") formed of one polymer network (hereinafter, referred to as "first polymer network") of the two polymer networks forming the double-network gel is prepared. Although the method of preparing the first polymer network gel is not particularly limited, a solution containing a monomer for forming the first polymer network gel, a cross-linking agent, and the salt-hydrogen bond donor mixture is prepared, and is polymerized and cross-linked to prepare the first polymer network gel.

The cross-linking agent is not particularly limited and may be any one which can form a cross-linked structure. Examples thereof include ethylene glycol di(meth)acrylate, diethylene glycol di(meth)acrylate, triethylene glycol di(meth)acrylate, divinylbenzene, methylene bisacrylamide, and the like.

In the next step, the first polymer network gel is impregnated with a solution containing a monomer for forming the other polymer network (hereinafter, referred to as "second polymer network") of the two polymer networks and a cross-linking agent, thereby preparing a monomer-containing first polymer network gel. In this time, the solution used for impregnation of the first polymer network gel may further contain the salt-hydrogen bond donor mixture.

Examples of the method of impregnating the first polymer network gel with the solution containing a monomer for forming a second polymer network and a cross-linking agent include, but should not be limited to, a method of immersing the first polymer network gel into the solution, and the like. The same cross-linking agents as described above can be used.

In the next step, the monomer-containing first polymer network gel prepared above is brought into contact with the base 10 having a surface to which the substituent reactive with a radical active species is introduced, and is reacted in this contact state. This simultaneously progresses formation of the second polymer network from the monomer for forming the second polymer network, which is contained in the monomer-containing first polymer network gel, and a reaction between the monomer for forming the second polymer network and the substituent reactive with a radical active species, which is introduced onto the base 10. Thereby, polymer chains of the double-network gel can form the polymer brush layer 20 on the base 10, the polymer brush layer 20 being swelled with the salt-hydrogen bond donor mixture.

In the second embodiment, similarly to the first embodiment described above, the salt-hydrogen bond donor mixture above is also used as a swelling agent for swelling the polymer chains forming a cross-linked network structure, which form the polymer brush layer 20. This can reduce the coefficient of friction of the polymer brush layer 20 and can improve low friction sliding properties.

Third Embodiment

A third embodiment according to the present invention will now be described.

Figure 2:
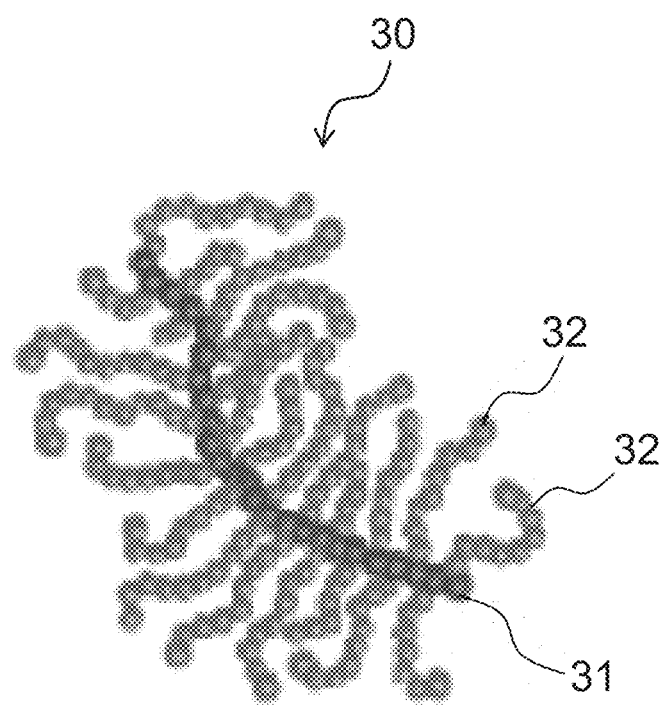
FIG. 2 is a schematic view showing the structure of a polymer containing branched graft chains according to a third embodiment of the present invention.

FIG. 2 shows a branched polymer constituting the composite material according to the third embodiment according to the present invention. As shown in FIG. 2, a branched polymer 30 according to the third embodiment has a structure including a linear main chain (linear main polymer chain) 31 as a substrate and a plurality of polymer graft chains (side chains) 32 branched therefrom. The composite material according to the third embodiment comprises the branched polymer 30 swelled with the above-mentioned salt-hydrogen bond donor mixture. The branched polymer 30 has a shape like a bottle brush (a brush for washing containers having a bottled structure).

As described above, the branched polymer 30 has a branched polymeric structure in which the side chains 32 are branched from the linear main chain 31, and the main chain 31 and the side chains 32 each are composed of repeating units connected, each of the repeating units containing at least carbon and hydrogen atoms.

The main chain 31 has a number average degree of polymerization of preferably 10 to 10,000, more preferably 10 to 1,000, still more preferably 10 to 100. Control of the number average degree of polymerization of the main chain 31 within this range can further improve the low friction sliding properties of the resulting composite material comprising a polymer swelled with the above-mentioned salt-hydrogen bond donor mixture. Although not particularly limited, the number average degree of polymerization of the main chain 31 can be determined by measuring the number average molecular weight of a main chain precursor before introduction of the side chains 32, and dividing the measured number average molecular weight by the molecular weight of the monomer unit.

The side chains 32 may be linear or may have a branched structure or a cross-linked structure. The side chains 32 have a number average degree of polymerization of preferably 1 to 100, more preferably 1 to 50, still more preferably 5 to 20. Control of the number average degree of polymerization of the side chains 32 within this range can further improve the low friction sliding properties of the resulting composite material comprising a polymer swelled with the above-mentioned salt-hydrogen bond donor mixture. Although not particularly limited, the number average degree of polymerization of the side chains can be measured as follows: for example, when a reaction to extend the side chains 32 from the main chain 31 is performed in the process of synthesizing the branched polymer 30, a trace of a low molecular weight initiator (e.g., an organic compound having a halogen-substituted carbon group) is added to the reaction system to simultaneously synthesize free polymers having a repeating structure common to that of the polymer chains for the side chains 32. The number average degree of polymerization of the free polymers is measured, and is defined as the number average degree of polymerization of the side chains 32.

The number average molecular weight (Mn) of the entire branched polymer 30 including the main chain 31 and the side chains 32 is preferably 1,000 to 10,000,000, more preferably 1,000 to 1,000,000, still more preferably 5,000 to 500,000. Control of the number average molecular weight of the entire branched polymer 30 within this range can further improve the low friction sliding properties of the resulting composite material comprising a polymer swelled with the above-mentioned salt-hydrogen bond donor mixture. The number average molecular weight of the entire branched polymer 30 can be measured as a value against polystyrene standards by gel permeation chromatography.

The density of the side chains branched from the main chain, which is represented as the number of chains per 1 nm of the main chain contour length (chains/nm), is preferably 1 chain/nm or more, more preferably 2 chains/nm or more, still more preferably 3 chains/nm or more. Here, the density of the side chains can be determined from graft efficiency.

The branched polymer 30 used in the third embodiment may be any branched polymer having a structure as shown in FIG. 2 in which the side chains 32 are branched from the linear main chain 31 as a base, and is not particularly limited. Preferred is a compound represented by General Formula (13):

[Chem. 7]

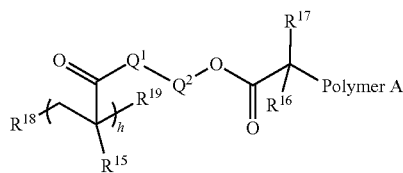

(13)

In General Formula (13), $R^{15}$ and $R^{16}$ each independently represent a hydrogen atom or a methyl group, and $R^{17}$ represents a $C_1$ to $C_{10}$ alkyl group. $R^8$ and $R^1$ represent a terminal group composed of an atom or an atomic group, and examples thereof include a hydrogen atom, an azido group, fragments of polymerization initiating groups, polymerization controlling groups, and the like. $Q^1$ represents —O— or —NH—, $Q^2$ represents a divalent organic group, h is 10 to 10,000, and Polymer A represents a polymer chain. In the compound represented by General Formula (13) above, the repeating structural unit where the number of repeating units in brackets is h corresponds to the main chain 31 of the branched polymer 30, and Polymer A corresponds to the side chain 32 of the branched polymer 30. In other words, the compound represented by General Formula (13) above has a configuration in which the side chains 32 each represented by Polymer A are linked to the main chain 31 having h of repeating units via a predetermined organic group extending from the carbon atom bonded to $R^{15}$ to the carbon atom bonded to Polymer A. In General Formula (13) above, Polymer A may be introduced to all the repeating units in the compound represented by General Formula (13), or may be introduced to only part of the repeating units. If Polymer A is introduced to only part of the repeating units in the compound represented by General Formula (13), the side chains of the repeating units without Polymer A introduced may be terminated with a hydrogen atom, a residue of the polymerization initiating group, or another atom or atomic group substituting the hydrogen atom or the polymerization initiating group.

$Q^2$ is a divalent organic group. Examples thereof include $C_1$ to $C_{18}$ alkylene groups, $C_1$ to $C_{10}$ oxyalkylene groups ($R^{20}O$) (where $R^{20}$ represents a $C_1$ to $C_{18}$ alkylene group), linking structures formed of these oxyalkylene groups, divalent organic groups each formed of a combination of at least two of these organic groups (the $C_1$ to $C_{18}$ alkylene groups, the $C_1$ to $C_{10}$ oxyalkylene groups, and the linking structures of the oxyalkylene groups), and the like. Here, the alkylene group and the alkylene group of the oxyalkylene group may be linear or branched, or may have a cyclic structure. Specific examples of the alkylene group include an ethylene group, a propylene group, a butylene group, a cyclohexylene group, and the like. The alkylene groups and the alkylene groups of the oxyalkylene groups may be substituted by a substituent. Examples of the substituent include $C_1$ to $C_{10}$ alkyl groups, $C_6$ to $C_{40}$ aryl groups, and $C_3$ to $C_{40}$ heteroaryl groups, and these substituents may be further substituted by a substituent.

In General Formula (13), Polymer A preferably has constitutional units derived from an (meth)acrylic monomer. Examples of (meth)acrylic monomers include (cyclo)alkyl (meth)acrylates, such as methyl (meth)acrylate, ethyl (meth)acrylate, propyl (meth)acrylate, isopropyl (meth)acrylate, n-butyl (meth)acrylate, 2-methylpropyl (meth)acrylate, t-butyl (meth)acrylate, pentyl (meth)acrylate, hexyl (meth)acrylate, octyl (meth)acrylate, 2-ethylhexyl (meth)acrylate, nonyl (meth)acrylate, decyl (meth)acrylate, isodecyl (meth)acrylate, lauryl (meth)acrylate, tetradecyl (meth)acrylate, octadecyl (meth)acrylate, behenyl (meth)acrylate, isostearyl (meth)acrylate, cyclohexyl (meth)acrylate, t-butylcyclohexyl (meth)acrylate, isobornyl (meth)acrylate, trimethylcyclohexyl (meth)acrylate, cyclodecyl (meth)acrylate, cyclodecylmethyl (meth)acrylate, tricyclodecyl (meth)acrylate, benzyl (meth)acrylate, dicyclopentenyloxyethyl (meth)acrylate, and dicyclopentanyl (meth)acrylate; aryl (meth)acrylates such as phenyl (meth)acrylate and naphthyl (meth)acrylate; alkenyl (meth)acrylates, such as allyl (meth)acrylate; hydroxyl group-containing (meth)acrylates, such as 2-hydroxyethyl (meth)acrylate, 2-hydroxypropyl (meth)acrylate, and (poly)ethylene glycol mono(meth)acrylate; glycol monoalkylether (meth)acrylates such as (poly)ethylene glycol monomethyl ether (meth)acrylate, (poly)ethylene glycol monoethyl ether (meth)acrylate, (poly)ethylene glycol monolauryl ether (meth)acrylate, and (poly)propylene glycol monomethyl ether (meth)acrylate; carboxy group-containing (meth)acrylates, such as (meth)acrylic acid, mono-2-((meth)acryloyloxy)ethyl phthalate, mono-2-((meth)acryloyloxy)ethyl succinate, mono-2-((meth)acryloyloxy)ethyl hexahydrophthalate, and mono-2-((meth)acryloyloxy)ethyl trimellitate; (meth)acrylates having an acid group other than a carboxy group, such as (meth)acryloyloxyethyl phosphoric acid esters and (meth)acryloyloxyethyl sulfonic acids; amino group-containing (meth)acrylates, such as dimethylaminoethyl (meth)acrylate, diethylaminoethyl (meth)acrylate, and t-butylaminoethyl (meth)acrylate; (meth)acrylates having a quaternary ammonium salt group, such as chlorotrimethylammonium ethyl (meth)acrylate; isocyanate group-containing (meth)acrylates, such as those obtained by blocking the isocyanate groups of (meth)acryloyloxyethyl isocyanate and 2-(2-isocyanatoethoxy)ethyl (meth)acrylate with ε-caprolactone, methyl ethyl ketone oxime (MEK oxime), and pyrazole; cyclic (meth)acrylates, such as tetrahydrofurfuryl (meth)acrylate; halogen-containing (meth)acrylates, such as octafluorooctyl (meth)acrylate and tetrafluoroethyl (meth)acrylate; (meth)acrylates which absorb ultraviolet light, such as 2-(4-benzoxy-3-hydroxyphenoxy)ethyl (meth)acrylate and 2-(2'-hydroxy-5-(meth)acryloyloxyethylphenyl)-2H-benzotriazole; silicon-containing (meth)acrylates having a trimethoxysilyl group or a dimethylsilicone chain; and the like. Macromonomers prepared by introducing an (meth)acrylic group to one terminal of oligomers prepared through polymerization of these monomers can also be used.

Polymer A may be a homopolymer, or may be a copolymer having a random structure or a copolymer having a block structure.

The compound represented by General Formula (13) above can be prepared by preparing Polymer A, for example, through grafting and growth of a polymer chain to and from an active site which is a carbon radical generated by elimination of a group represented by $T^1$ from a compound represented by General Formula (15) below as a polymer (initiating group-containing polymer) of a monomer represented by General Formula (14) below. Here, the compound represented by General Formula (15) (polymer before introduction of Polymer A) containing the polymerization initiating group ($T^1$) is referred to as "initiating group-containing polymer", and the radical generated through a reaction of the polymerization initiating group is referred to as "active site" in some cases.

[Chem. 8]

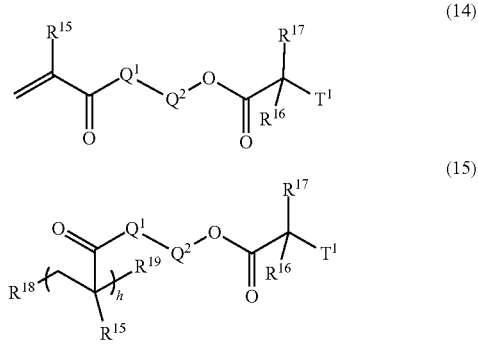

In General Formula (14) and (15), $R^{15}$, $R^{16}$, $R^{17}$, $R^{18}$, $R^{19}$, $Q^1$, $Q^2$, and h are as defined in General Formula (13).

The monomer represented by General Formula (14) can be synthesized through a reaction of an (meth)acrylate having hydroxyl group (hereinafter, referred to as "monomer (a)" with an acid component (hereinafter, referred to as "acid component (b)"):

[Chem. 9]

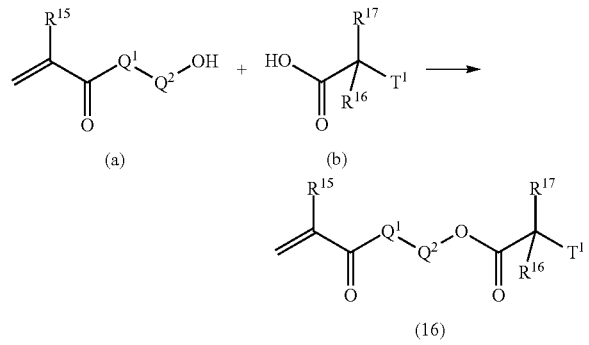

Examples of compounds which generate the monomer (a) where $Q^1$ in General Formula (14) is —O— include 2-hydroxyethyl (meth)acrylate, 2-hydroxypropyl (meth)acrylate, 3-hydroxypropyl (meth)acrylate, 2,3-dihydroxypropyl (meth)acrylate, 2-hydroxy-3-chloropropyl (meth)acrylate, 4-hydroxybutyl (meth)acrylate, hydroxycyclohexyl (meth)acrylate, polyethylene glycol mono(meth)acrylate, propylene glycol mono(meth)acrylate, ethylene propylene glycol (meth)acrylate, and the like.

Examples of compounds which generate the monomer (a) where $Q^1$ in General Formula (14) is —NH— include hydroxyethyl(meth)acrylamide; monomers prepared by reacting (meth)acrylic acid or an acid halide such as (meth)acrylic chloride with a compound having an amino group and one or more hydroxyl groups; and the like.

Examples of the acid component (b) include 2-chloropropionic acid, 2-bromopropionic acid, 2-chloro-2-methyl-propionic acid, 2-bromo-2-methyl-propionic acid, and the like. Acid halides thereof, acid anhydrides thereof, and the like can also be used as the acid component (b).

Alternatively, the compound represented by General Formula (15) can also be prepared through a reaction of a polymer of the monomer (a) above with the acid component (b).

As the branched polymer 30, the compound represented by General Formula (13) can be replaced by a product prepared by reacting the acid component (b) with a polymer of the monomer (a) and a monomer copolymerizable therewith, and then reacting the resulting compound with Polymer A.

In the third embodiment, as the branched polymer 30, a plurality of branched polymers 30 forming a cross-linked structure may be used, or a plurality of branched polymers 30 held together through ionic bonding, hydrogen bonding, hydrophobic interaction, or the like may be used. Alternatively, using a base or a filler, a polymerization initiating group may be introduced to the surface of the base or the filler, a polymerization reaction may be performed on the base or while the filler is present, thereby forming a composite of the branched polymer 30 and the base or the filler.

The composite material according to the third embodiment can be prepared by swelling such a branched polymer 30 with the above-mentioned salt-hydrogen bond donor mixture. Examples of the method of swelling the branched polymer 30 with the salt-hydrogen bond donor mixture include, but should not be limited to, a method of adding dropwise or applying the salt-hydrogen bond donor mixture to the branched polymer 30, and leaving the polymer; a method of immersing the branched polymer 30 into the salt-hydrogen bond donor mixture; and the like.

In the third embodiment, similarly to the first embodiment described above, the salt-hydrogen bond donor mixture is used as a swelling agent the branched polymer 30, and thus can improve low friction sliding properties.

EXAMPLES

Hereinafter, the present invention will be more specifically described by way of Examples, but these Examples should not be construed as limitations to the present invention.

Example 1

(Preparation of Salt-Hydrogen Bond Donor Mixture (A-1))

6.981 g of choline chloride (available from Tokyo Chemical Industry Co., Ltd., melting point: 302 to 305° C.) and 6.006 g (2 parts relative to 1 part of choline chloride on a molar basis, i.e., choline chloride:urea=1:2 (molar ratio)) of urea (available from KISHIDA CHEMICAL Co., Ltd., melting point: 133 to 135° C.) were dissolved in 10 g of methanol, followed by mixing at a temperature of 70° C. to prepare a mixed solution. In the next step, methanol was removed from the mixed solution while the system was being depressurized with a vacuum pump. Thereby, a salt-hydrogen bond donor mixture (A-1) containing choline chloride and urea was prepared. The salt-hydrogen bond donor mixture (A-1) was a colorless transparent liquid at normal temperature (25° C.) and had a melting point of 12° C.

(Formation of Polymer Chains on Surface of Silicon Base by Surface-Initiated Living Radical Polymerization)

3-((3-(Triethoxysilyl)propyl)thio)propyl-2-bromo-2-methyl propanoate (BPTPE) as an immobilization initiator and ethanol were mixed, and ethanol containing aqueous ammonia was mixed therewith to prepare an immobilization initiator-containing solution. In the next step, a silicon base was immersed in the resulting immobilization initiator-containing solution for 18 hours to prepare a silicon base having a surface to which a polymerization initiating group was introduced.

Separated from above, N,N-diethyl-N-(2-methacryloylethyl)-N-methylammonium•bis (trifluoromethylsulfonyl) imide (DEMM-TFSI) as a monomer having an ionically dissociable group (ionic liquid monomer), ethyl 2-bromo-2-methylpropionate (EBIB) as a radical initiator, 0.020 g of 2,2-bipyridyl as a ligand, and CuCl as a copper catalyst were mixed with acetonitrile to prepare a monomer solution.

The resulting monomer solution was applied to the surface of the silicon base having a polymerization initiating group introduced thereto, and the workpiece was heated in an incubator under an argon atmosphere at 70° C. for 32 hours. The resulting base was ultrasonically washed in acetonitrile for 10 minutes. This operation was repeated 3 times to wash off the polymerization solution. The resulting base was dried with nitrogen gas to prepare a silicon base having polymer chains formed on the base surface. Free polymers generated together in the synthetic system at this time were measured for the number average molecular weight (Mn), the weight average molecular weight (Mw), and the molecular weight distribution (Mw/Mn). It showed that Mn=1,431,500, Mw=1,702,600, Mw/Mn=1.189, and the thickness was 400 nm.

(Formation of Polymer Brush Layer)

The salt-hydrogen bond donor mixture (A-1) prepared as above was applied onto the surface of the silicon base to which the polymer chains were introduced, and was left to soak for 24 hours to swell the polymer chains. Thus, a silicon base having a polymer brush layer formed thereon (a dense polymer brush swelled with the salt-hydrogen bond donor mixture) was prepared. The formed polymer brush layer had a thickness of 1 to 1.2 μm.

(Friction Test)

Figure 3:
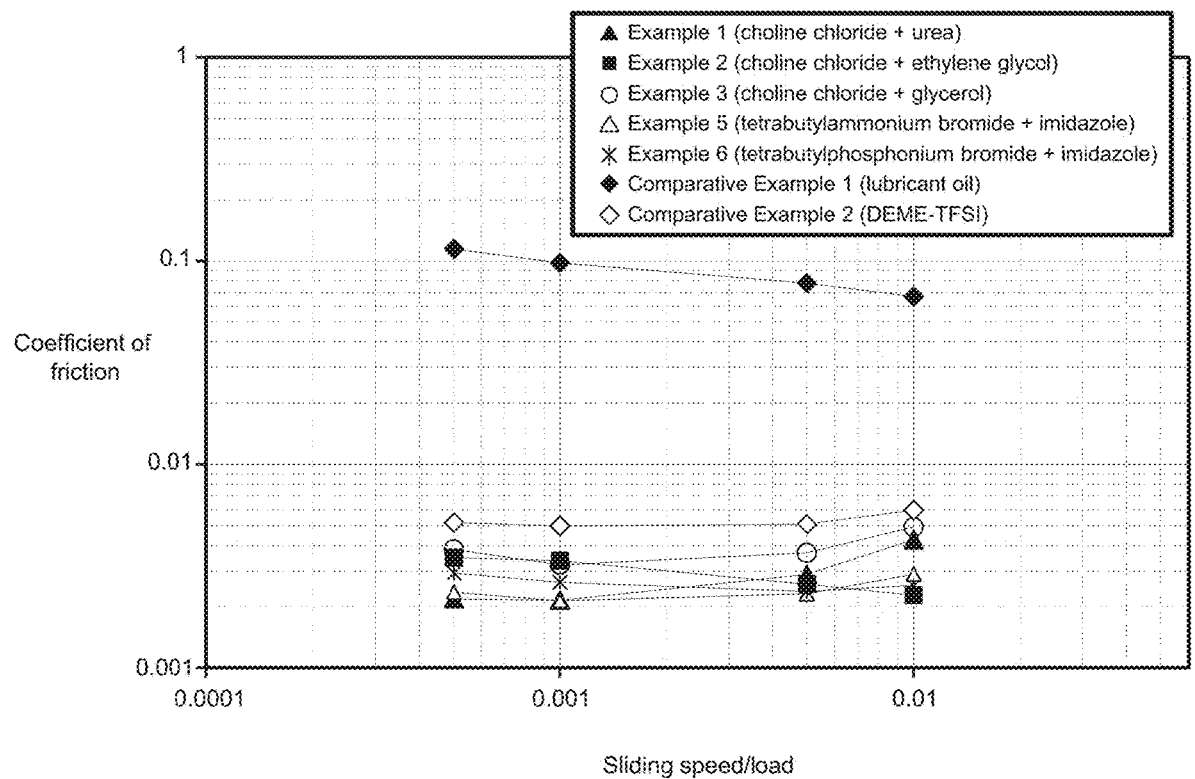
FIG. 3 is a graph showing the results of measurement of frictional force in Examples 1 to 3, 5, and 6 and Comparative Examples 1 and 2.

A friction test was performed using a ball-on-disc in which the resulting silicon base with a dense polymer brush swelled with the salt-hydrogen bond donor mixture was used for a disc and a glass ball (diameter: 10 mm) was used as a ball. Specifically, the silicon base was set on a friction abrasion tester "TRIBOGEAR TYPE-38" (available from Shinto Scientific Co., Ltd.), and the frictional force was measured. The test was a linear reciprocation test under the following measurement conditions: six sliding speeds of 0.5, 1, 5, 10, 30, and 50 mm/s, a sliding distance of 10 mm, a load of 1 N constant, a test temperature of 25° C., and a test humidity of 30%. The results are shown in FIG. 3. In FIG. 3, the results are plotted against the "sliding speed/load ("m/N·sec" in unit) in the abscissa and the "coefficient of friction" in the ordinate.

Example 2

(Preparation of Salt-Hydrogen Bond Donor Mixture (A-2))

4.6540 g of choline chloride (available from Tokyo Chemical Industry Co., Ltd., melting point: 302 to 305° C.) and 6.2070 g (2 parts relative to 1 part of choline chloride on a molar basis, i.e., choline chloride:ethylene glycol=1:2 (molar ratio)) of ethylene glycol (available from Tokyo Chemical Industry Co., Ltd., melting point: −12.9° C.) were mixed at a temperature of 70° C. to prepare a salt-hydrogen bond donor mixture (A-2) containing choline chloride and ethylene glycol. The resulting salt-hydrogen bond donor mixture (A-2) was a colorless transparent liquid at normal temperature (25° C.) and had a melting point of −66° C.

(Formation of Polymer Brush Layer, Friction Test)

In the next step, the resulting salt-hydrogen bond donor mixture (A-2) was applied onto the surface of a silicon base to which polymer chains were introduced in the same manner as in Example 1, and was left to soak for 24 hours. Thus, a silicon base having a polymer brush layer formed of swelled polymer chains (a dense polymer brush swelled with the salt-hydrogen bond donor mixture) was prepared. The formed polymer brush layer had a thickness of 1 to 1.2 μm.

The resulting dense polymer brush swelled with the salt-hydrogen bond donor mixture was subjected to the friction test in the same manner as in Example 1. The results are shown in FIG. 3.

Example 3

(Preparation of Salt-Hydrogen Bond Donor Mixture (A-3))

4.6540 g of choline chloride (available from Tokyo Chemical Industry Co., Ltd., melting point: 302 to 305° C.) and 9.2090 g (2 parts relative to 1 part of choline chloride on a molar basis, i.e., choline chloride:glycerol=1:2 (molar ratio)) of glycerol (available from KANTO CHEMICAL CO., INC., melting point: 17.8° C.) were mixed at a temperature of 70° C. to prepare a salt-hydrogen bond donor mixture (A-3) containing choline chloride and glycerol. The resulting salt-hydrogen bond donor mixture (A-3) was a colorless transparent liquid at normal temperature (25° C.) and had a melting point of −40° C.

(Formation of Polymer Brush Layer, Friction Test)

In the next step, the resulting salt-hydrogen bond donor mixture (A-3) was applied onto the surface of a silicon base to which polymer chains were introduced in the same manner as in Example 1, and was left to soak for 24 hours. Thus, a silicon base having a polymer brush layer formed of swelled polymer chains (a dense polymer brush swelled with the salt-hydrogen bond donor mixture) was prepared. The formed polymer brush layer had a thickness of 1 to 1.2 μm.

The resulting dense polymer brush swelled with the salt-hydrogen bond donor mixture was subjected to the friction test in the same manner as in Example 1. The results are shown in FIG. 3.

Example 4

(Preparation of Salt-Hydrogen Bond Donor Mixture (A-4))

4.5427 g of zinc chloride (available from FUJIFILM Wako Pure Chemical Corporation, melting point: 275° C.) and 7.0070 g (3.5 parts relative to 1 part of zinc oxide on a molar basis, i.e., zinc oxide:urea=1:3.5 (molar ratio)) of urea (available from KISHIDA CHEMICAL Co., Ltd., melting point: 133 to 135° C.) were dissolved in 10 g of methanol, followed by mixing at a temperature of 70° C. to prepare a mixed solution. In the next step, methanol was removed from the mixed solution while the system was being depressurized with a vacuum pump. Thereby, a salt-hydrogen bond donor mixture (A-4) containing zinc chloride and urea was prepared. The resulting salt-hydrogen bond donor mixture (A-4) was a colorless transparent liquid at normal temperature (25° C.). Its high viscosity of the salt-hydrogen bond donor mixture, as it was, did not allow significant measurement of friction. Thus, a solution (A-4-water) and a solution (A-4-MeOH) having a reduced viscosity were prepared by adding 20 wt % of water or MeOH (methanol) as a viscosity adjusting component.

(Formation of Polymer Brush Layer, Friction Test)

Figure 4:
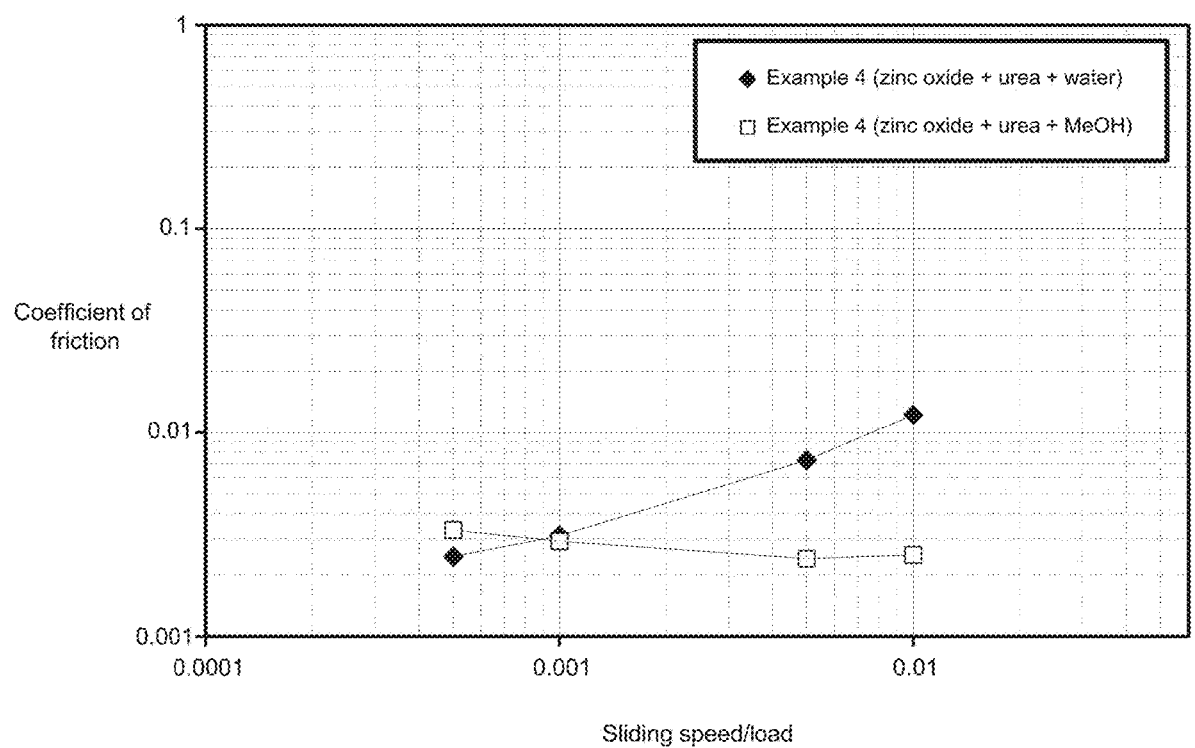
FIG. 4 is a graph showing the results of measurement of frictional force in Example 4.

In the next step, each of the resulting mixtures (A-4-water) and (A-4-MeOH) of the salt-hydrogen bond donor mixture and the corresponding viscosity adjusting component was applied onto the surface of silicon bases to which polymer chains were introduced in the same manner as in Example 1, and was left to soak for 24 hours. Thus, silicon bases having polymer brush layers formed of swelled polymer chains (a dense polymer brush swelled with the salt-hydrogen bond donor mixture) were prepared. The formed polymer brush layers each had a thickness of 1 to 1.2 μm. The resulting dense polymer brushes swelled with the salt-hydrogen bond donor mixture were subjected to the friction test in the same manner as in Example 1. The results are shown in FIG. 4.

Example 5

(Preparation of Salt-Hydrogen Bond Donor Mixture (A-5))

6.4476 g of tetrabutylammonium bromide (available from Tokyo Chemical Industry Co., Ltd., melting point: 103° C.) and 3.1771 g of imidazole (available from Tokyo Chemical Industry Co., Ltd., melting point: 89 to 91° C.) (7 parts relative to 3 parts of tetrabutylammonium bromide on a molar basis, i.e., tetrabutylammonium bromide:imidazole=3:7 (molar ratio)) were weighed, and were mixed while being crushed in a mortar. In the next step, the resulting mixture was transferred to a glass vessel, and was stirred in an oil bath at 70° C. to prepare a salt-hydrogen bond donor mixture (A-5) containing tetrabutylammonium bromide and imidazole. The resulting salt-hydrogen bond donor mixture (A-5) was a colorless transparent liquid at normal temperature (25° C.).

(Formation of Polymer Chains on Surface of Silicon Base by Surface-Initiated Living Radical Polymerization)

Methyl methacrylate (hereinafter, MMA), ethyl 2-bromo-2-methylpropionate (hereinafter, EBIB), copper(I) bromide (hereinafter, Cu(I)Br), copper (II) bromide (hereinafter, Cu(II)Br$_2$), and 4,4'-dinonyl-2,2'-bipyridyl (hereinafter, dNbipy) were mixed in a pressure-resistant container available from Teflon (registered trademark). Using a high pressure reactor (HPS-700, Syn Corporation), surface-initiated living radical polymerization (SI-ATRP) was performed at 60° C. and 500 MPa in the presence of a silicon base or a glass disc having a surface to which (2-bromoisobutyloxy) hexyltriethoxysilane (hereinafter, BHE) was immobilized.

After a predetermined time, the base was extracted from the reaction solution, was ultrasonically washed with tetrahydrofuran (hereinafter, THF), and was dried to prepare a silicon base having a base surface to which polymer graft chains were introduced. Free polymers generated together in the synthetic system at this time were measured for the number average molecular weight (Mn), the weight average molecular weight (Mw), and the molecular weight distribution (Mw/Mn). It showed that Mn=2,010,000, Mw=1,600,000, Mw/Mn=1.26, and the thickness was 1 μm.

(Formation of polymer brush layer, friction test) The salt-hydrogen bond donor mixture (A-5) prepared above was applied onto the surface of the resulting silicon base to which the polymer chains were introduced, and was left to soak for 24 hours. Thus, the silicon base having a polymer brush layer formed of swelled polymer chains (a dense polymer brush swelled with the salt-hydrogen bond donor mixture) was prepared. The formed polymer brush layer had a thickness of 3 μm±1 μm.

The resulting dense polymer brush swelled with the salt-hydrogen bond donor mixture was subjected to the friction test in the same manner as in Example 1. The results are shown in FIG. 3.

Example 6

(Preparation of Salt-Hydrogen Bond Donor Mixture (A-6))

6.7868 g of tetrabutylphosphonium bromide (available from Tokyo Chemical Industry Co., Ltd., melting point: 100 to 103° C.) and 3.1771 g (7 parts relative to 3 parts of tetrabutylphosphonium bromide on a molar basis, i.e., tetrabutylphosphonium bromide:imidazole=3:7 (molar ratio)) of imidazole (available from Tokyo Chemical Industry Co., Ltd., melting point: 89 to 91° C.) were weighed, and were mixed while being crushed in a mortar. In the next step, the resulting mixture was transferred to a glass vessel, and was stirred with the glass vessel placed in an oil bath at 70° C. to prepare a salt-hydrogen bond donor mixture (A-6) containing tetrabutylphosphonium bromide and imidazole. The resulting salt-hydrogen bond donor mixture (A-6) was a colorless transparent liquid at normal temperature (25° C.).

(Formation of Polymer Brush Layer, Friction Test)

In the next step, the salt-hydrogen bond donor mixture (A-6) prepared above was applied onto the surface of the silicon base to which the polymer chains were formed and introduced in the same manner as in Example 5, and was left to soak for 24 hours. Thus, a silicon base having a polymer brush layer formed of swelled polymer chains (a dense polymer brush swelled with the salt-hydrogen bond donor mixture) was prepared. The formed polymer brush layer had a thickness of 3 μm±1 μm.

The resulting dense polymer brush swelled with the salt-hydrogen bond donor mixture was subjected to the friction test in the same manner as in Example 1. The results are shown in FIG. 3.

Comparative Example 1

(Formation of Polymer Brush Layer, Friction Test)

A polyol ester (POE) (available from JX Holdings (JXHD)) as a lubricant oil was applied onto the surface of a silicon base to which polymer chains were introduced in the same manner as in Example 1, and was left to soak for 24 hours.

The resulting dense polymer brush soaked with the lubricant oil was subjected to the friction test in the same manner as in Example 1. The results are shown in FIG. 3.

Comparative Example 2

A polymer brush layer was formed in the same manner as in Example 1 using a silicon base to which polymer chains were introduced in the same manner as in Example 1 except that the salt-hydrogen bond donor mixture (A-1) was replaced by N,N-diethyl-N-methyl-N-(2-methoxyethyl) ammonium•bis(trifluoromethylsulfonyl)imide (DEME-TFSI, available from KANTO CHEMICAL CO., INC.), and was subjected to the friction test in the same manner as in Example 1. The results are shown in FIG. 3.

EVALUATIONS

FIG. 3 shows that as the composite material comprising a plurality of polymer chains fixed to a base and swelled with a mixture which contains a salt and a hydrogen bond-donating compound and has a melting point maintained at 100° C. or less, the dense polymer brushes had a significantly reduced coefficient of friction compared to the dense polymer brush soaked with the lubricant oil. These also demonstrated low friction properties better than those of the dense polymer brush soaked with the ionic liquid DEME-TFSI. FIG. 3 verifies that such excellent low friction properties are sufficiently attained even if the "sliding speed/load" is varied, and from these results, it is concluded that the present invention can ensure excellent low friction properties under a wide range of conditions.

Moreover, FIG. 4 shows that low friction can be ensured by the dense polymer brush as the composite material comprising a plurality of polymer chains fixed to a base even if the mixture containing a salt and a hydrogen bond-donating compound and having a melting point maintained at 100° C. or less is mixed with water or an ionic liquid to adjust the viscosity.

The invention claimed is:

1. A composite material comprising a plurality of polymer chains fixed to a substrate and swelled with a mixture which contains a salt and a hydrogen bond-donating compound and has a melting point maintained at 100° C. or less, wherein the mixture has a melting point lower than that of the salt as a constituent of the mixture and that of the hydrogen bond-donating compound as a constituent of the mixture.

2. The composite material according to claim 1, wherein the melting point of the mixture is maintained at 100° C. or less by mixing the salt and the hydrogen bond-donating compound to provide lowering of a eutectic melting point.

3. The composite material according to claim 1, wherein the mixture further contains a third component having compatibility with the salt and the hydrogen bond-donating compound.

4. The composite material according to claim 1, wherein the salt contained in the mixture is solid at normal temperature (25° C.) and the hydrogen bond-donating compound contained therein is solid at normal temperature (25° C.).

5. The composite material according to claim 1, wherein the salt and the hydrogen bond-donating compound constitute the mixture in a molar ratio of "salt:hydrogen bond-donating compound" of 1:0.5 to 1:12.

6. The composite material according to claim 1, wherein the salt in the mixture is a compound represented by General Formula (1) or (2):

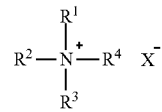

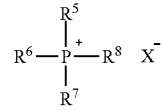

(where in General Formulae (1) and (2), $R^1$ to $R^8$ each independently represent a $C_1$ to $C_{12}$ alkyl group, a $C_6$ to $C_{12}$ aryl group, a group represented by $-(CH_2)_m-OR^9$ (where $R^9$ is a $C_1$ to $C_4$ alkyl group, and m is 1 to 4), a group represented by $-(CH_2)_n-OH$ (where n is an integer of 1 to 4), a group represented by $-(CH_2)_p-OC(=O)R^{10}$ (where $R^{10}$ is a $C_1$ to $C_4$ alkyl group, and p is 1 to 4), or $-(CH_2)_q-Y^1$ (where $Y^1$ is a halogen element, and q is 1 to 4), and $X^-$ is a monovalent anion).

7. The composite material according to claim 1, wherein the plurality of polymer chains is covalently fixed onto the substrate.

8. The composite material according to claim 7, wherein the plurality of polymer chains has a molecular weight distribution (Mw/Mn) of 1.5 or less.

9. The composite material according to claim 7, wherein the area coverage of the plurality of polymer chains is 10% or more of the area of the substrate surface.

10. The composite material according to claim 1, wherein a layer containing the plurality of polymer chains and the mixture is formed on the substrate, the layer having a thickness of 500 nm or more.

11. The composite material according to claim 1, wherein the plurality of polymer chains are polymer graft chains branched from a main polymer chain.

12. The composite material according to claim 1, wherein the plurality of polymer chains forms a cross-linked structure.

13. The composite material according to claim 1, wherein the plurality of polymer chains each have an ionically dissociable group.

14. The composite material according to claim 1, wherein the hydrogen bond-donating compound is at least one selected from the group consisting of aliphatic polyhydric alcohols, urea compounds, and imidazole compounds.

15. A composite material comprising a plurality of polymer chains fixed to a substrate and swelled with a mixture which contains a salt and a hydrogen bond-donating compound and has a melting point maintained at 100° C. or less, wherein the melting point of the mixture is maintained at 100° C. or less by mixing the salt and the hydrogen bond-donating compound to provide lowering of a eutectic melting point.

* * * * *